(12) United States Patent
Lynn et al.

(10) Patent No.: US 11,989,036 B2
(45) Date of Patent: May 21, 2024

(54) VEHICLE WITH COMMUNICATIVE BEHAVIORS

(71) Applicant: Piaggio Fast Forward, Inc., Boston, MA (US)

(72) Inventors: Gregory Stewart Lynn, Venice, CA (US); Jeffrey Schnapp, Cambridge, MA (US)

(73) Assignee: Piaggio Fast Forward Inc., Boston, MA (US)

( * ) Notice: Subject to any disclaimer, the term of this patent is extended or adjusted under 35 U.S.C. 154(b) by 341 days.

(21) Appl. No.: 17/542,336

(22) Filed: Dec. 3, 2021

(65) Prior Publication Data

US 2023/0176591 A1    Jun. 8, 2023

(51) Int. Cl.
*G05D 1/08* (2006.01)
*G05D 1/00* (2006.01)

(52) U.S. Cl.
CPC ......... *G05D 1/0891* (2013.01); *G05D 1/0223* (2013.01)

(58) Field of Classification Search
CPC .................... G05D 1/0891; G05D 1/0223
See application file for complete search history.

(56) References Cited

U.S. PATENT DOCUMENTS

| | | |
|---|---|---|
| 6,782,308 B2 | 8/2004 | Yamaura |
| 8,700,251 B1 | 4/2014 | Zhu et al. |
| 8,751,042 B2 | 6/2014 | Lee et al. |
| 8,849,494 B1 | 9/2014 | Herbach et al. |
| 8,954,217 B1 | 2/2015 | Montemerlo et al. |
| 8,954,252 B1 | 2/2015 | Urmson et al. |
| 9,008,890 B1 | 4/2015 | Herbach et al. |
| 9,052,997 B2 | 6/2015 | Ono |
| 9,156,159 B2 | 10/2015 | Hodgins et al. |
| 9,162,720 B2 | 10/2015 | Mistry et al. |
| 9,509,521 B2 | 11/2016 | Hoomani et al. |
| 9,625,906 B2 | 4/2017 | Meuleau et al. |
| 9,646,356 B1 | 5/2017 | Schwie et al. |

(Continued)

FOREIGN PATENT DOCUMENTS

CN    108515508 B  *  9/2020  .............. B25J 5/007
DE    102013214328        12/2017

(Continued)

OTHER PUBLICATIONS

English translation of JP-2009023499-A (Year: 2009).*

(Continued)

*Primary Examiner* — Anshul Sood
*Assistant Examiner* — Matthew Ho
(74) *Attorney, Agent, or Firm* — Sunstein LLP

(57) ABSTRACT

Provided is a self-driving vehicle, e.g., a follower vehicle, that engages in communicative behaviors using body dynamics. Also provided is a method of using body dynamics to communicate behaviors in a self-driving vehicle. The vehicle may include a shifting assembly configured to shift and/or tilt a vehicle body to communicate such behaviors, e.g., acceleration, deceleration, and near constant velocity. The shifting and/or tilting of the body in combination with the vehicle's operation communicates those operations to bystanders. With better informed bystanders, improved safety between bystanders and the vehicle may be achieved.

28 Claims, 21 Drawing Sheets

(56) References Cited

U.S. PATENT DOCUMENTS

| | | |
|---|---|---|
| 9,776,323 B2 | 10/2017 | O'Sullivan et al. |
| 9,926,025 B1 | 3/2018 | Blankespoor et al. |
| 10,216,865 B1 | 2/2019 | Theobald |
| 10,234,868 B2 | 3/2019 | Lavoie et al. |
| 10,556,334 B1 | 2/2020 | Theobald |
| 10,585,430 B2 | 3/2020 | Lavoie |
| 11,205,073 B2 | 12/2021 | Hartman et al. |
| 2003/0069669 A1 | 4/2003 | Yamaura |
| 2010/0204828 A1 | 8/2010 | Yoshizawa et al. |
| 2012/0054645 A1 | 3/2012 | Hoomani et al. |
| 2012/0083960 A1 | 4/2012 | Zhu et al. |
| 2013/0158707 A1 | 6/2013 | Lee et al. |
| 2013/0238122 A1 | 9/2013 | Hodgins et al. |
| 2014/0032090 A1 | 1/2014 | Ono |
| 2015/0284010 A1 | 10/2015 | Beardsley et al. |
| 2016/0129957 A1* | 5/2016 | Murakami ........... G05D 1/0891 701/70 |
| 2016/0209843 A1 | 7/2016 | Meuleau et al. |
| 2017/0190051 A1 | 7/2017 | O'Sullivan et al. |
| 2018/0133900 A1 | 5/2018 | Breazeal et al. |
| 2018/0229372 A1 | 8/2018 | Breazeal et al. |
| 2018/0364737 A1 | 12/2018 | Lavoie et al. |
| 2019/0392211 A1 | 12/2019 | Hartman et al. |
| 2020/0091565 A1 | 3/2020 | Väin et al. |
| 2020/0124159 A1 | 4/2020 | Weiss |
| 2020/0239098 A1* | 7/2020 | Schnapp ............... B60K 1/00 |
| 2023/0004173 A1* | 1/2023 | Jo ....................... G05D 1/0891 |

FOREIGN PATENT DOCUMENTS

| | | |
|---|---|---|
| EP | 1083490 | 3/2001 |
| JP | 2009023499 A * | 2/2009 |

OTHER PUBLICATIONS

English translation of CN-108515508-B (Year: 2020).*
Torrens, "Computational Streetscapes", Computation 2016, vol. 4, No. 37, (Sep. 20, 2016), 38 pages.
European Patent Office, International Search Report and Written Opinion issued in PCT application No. PCT/US2022/051374, dated Feb. 7, 2023, 13 pages.

* cited by examiner

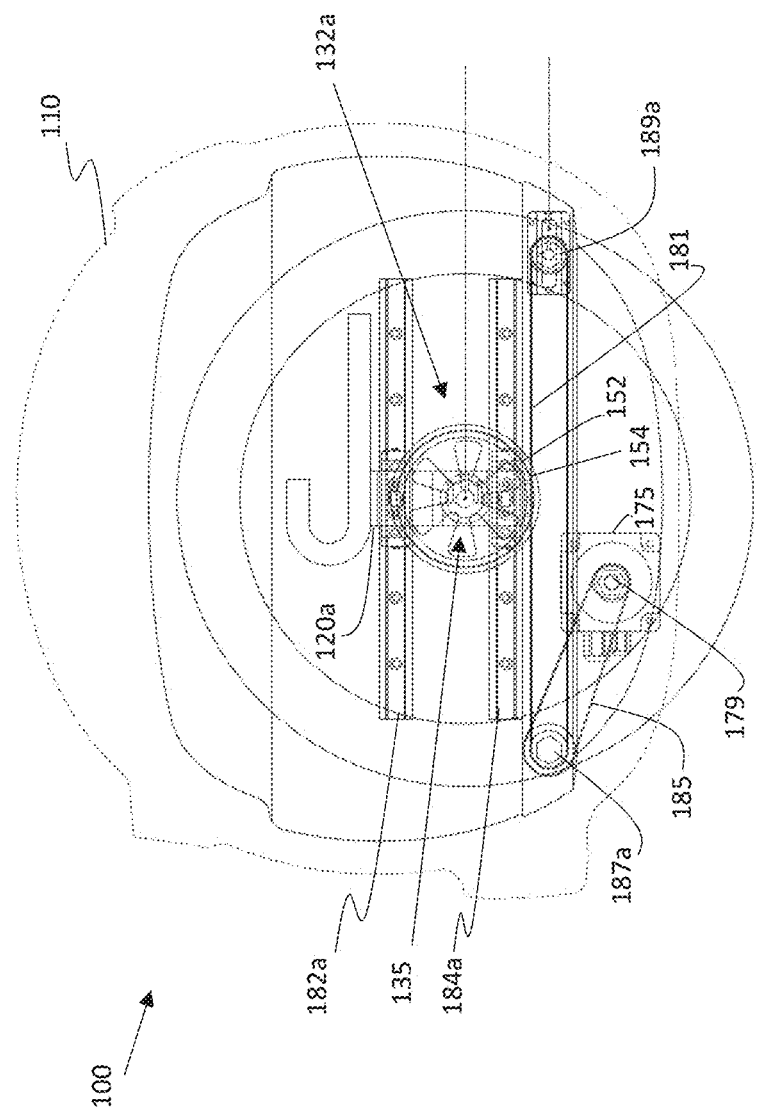

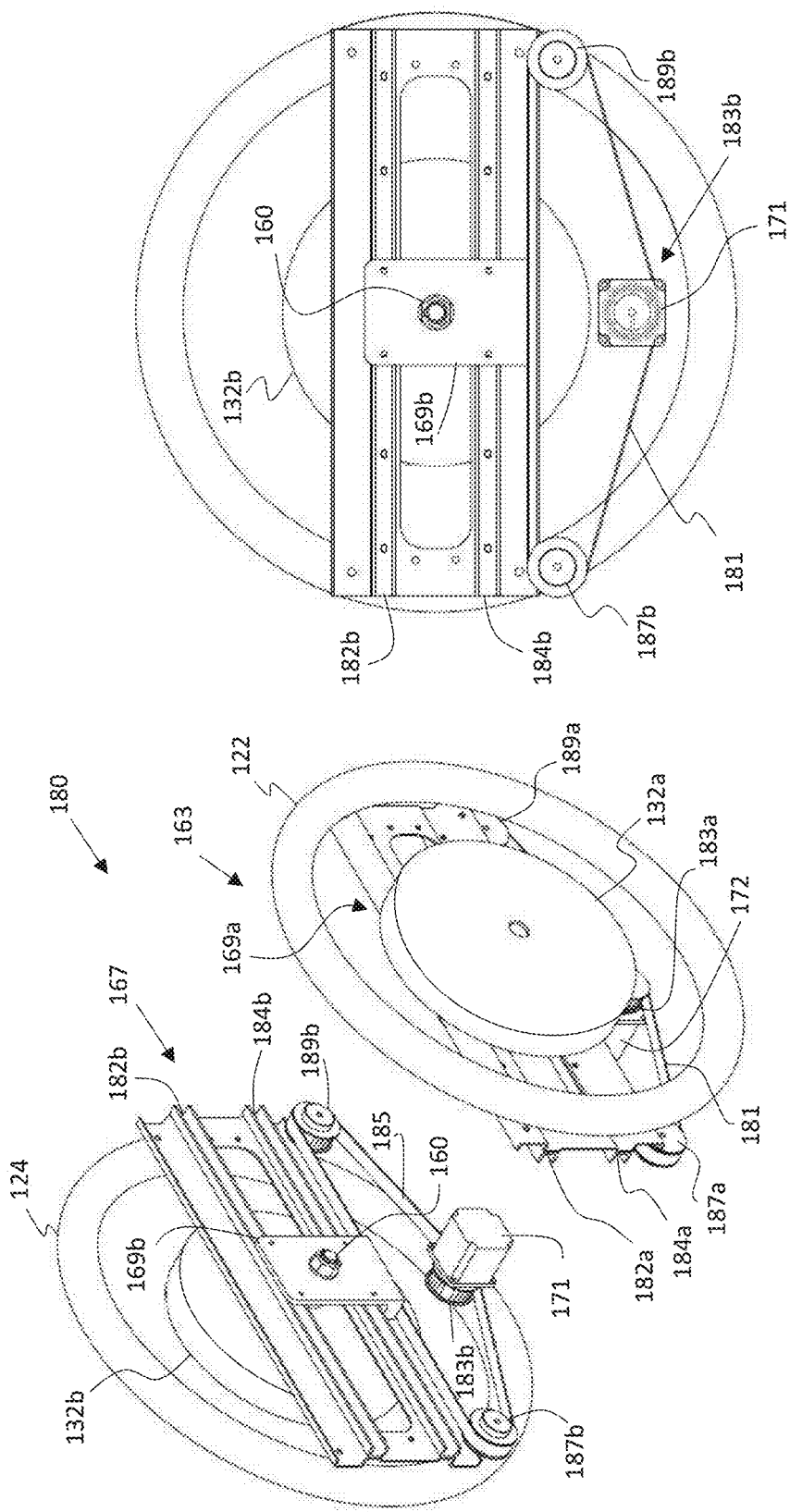

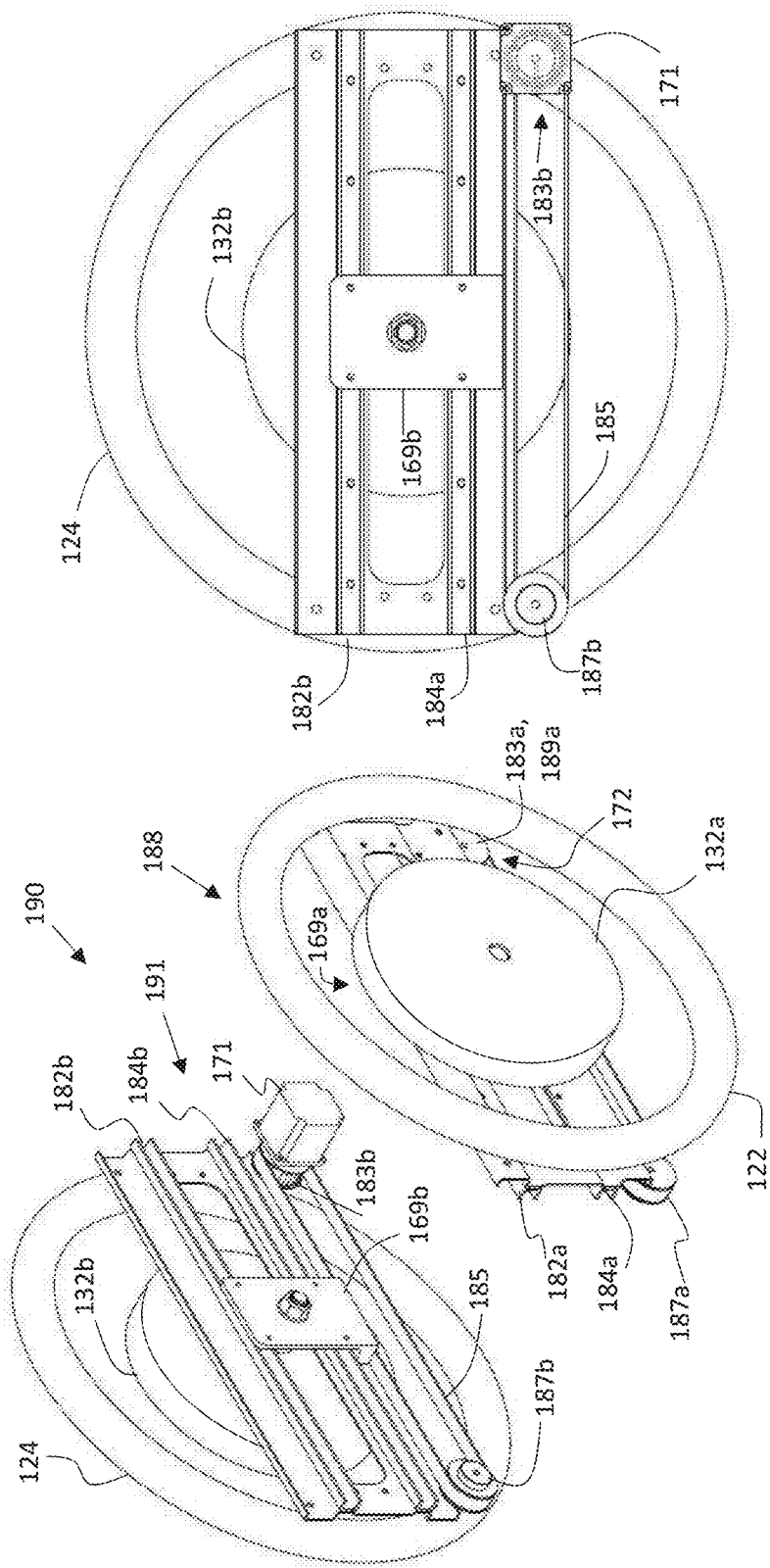

VEHICLE WITH COMMUNICATIVE BEHAVIORS

CROSS REFERENCE TO RELATED APPLICATIONS

The present application may be related to U.S. application Ser. No. 17/049,141 filed Oct. 20, 2020, which was a national stage 371 application of PCT/US2019/030208 filed May 1, 2019, which claimed priority to U.S. Provisional Appl. 62/665,183 filed May 1, 2018, each of which is incorporated herein by reference in its entirety.

The present application may be related to U.S. application Ser. No. 16/660,560 filed Oct. 22, 2019, which claimed priority to U.S. Provisional Appl. 62/748,958 filed Oct. 22, 2018 and U.S. Provisional Appl. 62/748,969 filed Oct. 22, 2018, each of which is incorporated herein by reference in its entirety.

The present application may also be related to U.S. application Ser. No. 16/660,570 filed Oct. 22, 2019 which claimed priority to U.S. Provisional Appl. 62/749,111 filed Oct. 22, 2018, each of which is incorporated herein by reference in its entirety.

The present application may also be related to U.S. application Ser. No. 16/652,545 filed Mar. 31, 2020, which was a national stage 371 application of PCT/US2018/055135 filed Oct. 10, 2018, each of which is incorporated herein by reference in its entirety.

The present application may also be related to U.S. application Ser. No. 15/296,884 filed Oct. 18, 2016, which was a national stage 371 application of PCT/US2018/055135 filed Oct. 10, 2018, each of which is incorporated herein by reference in its entirety.

FIELD OF INTEREST

The present inventive concepts relate to the field of vehicles, and more particularly, although not exclusively, to autonomous or self-driving vehicle.

SUMMARY

In accordance with aspects of the inventive concepts, provided is a self-driving vehicle, comprising a plurality of wheels coupled to a chassis, a body coupled to a shifting assembly that is coupled to the chassis, a drive system comprising one or more drive motors arranged to drive one or more of the wheels, a body control system comprising one or more attitude motors arranged to drive the shifting assembly, and at least one processor configured to control the one or more attitude motors to cause the shifting assembly to shift and/or tilt the body to communicate behaviors of the vehicle based on operation of the one or more drive motors.

In various embodiments, the plurality of wheels consists of two wheels.

In various embodiments, the vehicle is a follower vehicle comprising one or more sensors configured to acquire, track, and follow a leader.

In various embodiments, the behaviors of the vehicle comprise an acceleration behavior where the body is tilted rearward to have a non-zero orientation of less than 0 degrees relative to a vertical axis and a travel direction of the vehicle when the one or more drive motors accelerate the vehicle in the travel direction.

In various embodiments, the behaviors of the vehicle comprise an acceleration behavior where the body is shifted rearwardly up to about 100 millimeters relative to a vertical axis and a travel direction of the vehicle when the one or more drive motors accelerate the vehicle in the travel direction.

In various embodiments, a magnitude of the shift and/or tilt is a function of and/or proportional to a rate of acceleration.

In various embodiments, the behaviors of the vehicle comprise a deceleration behavior where the body is tilted forward to have a non-zero orientation of more than 0 degrees relative to a vertical axis and a travel direction of the vehicle when the one or more drive motors decelerate the vehicle in the travel direction.

In various embodiments, the behaviors of the vehicle comprise a deceleration behavior where the body is shifted forward, e.g., up to about 100 millimeters, relative to a vertical axis and a travel direction of the vehicle when the one or more drive motors decelerate the vehicle in the travel direction.

In various embodiments, a magnitude of the shift and/or tilt is a function of and/or proportional to a rate of deceleration.

In various embodiments, the behaviors of the vehicle comprise a pause behavior where the body has a near-zero tilt orientation and/or a near-zero shift orientation relative to a vertical axis of the vehicle when the vehicle is not traveling.

In various embodiments, the behaviors of the vehicle comprise an acceleration behavior, a deceleration behavior, and a constant speed behavior and the at least one processor is configured to control the one or more attitude motors to shift and/or tilt the body rearward during the acceleration behavior, shift and/or tilt the body forward during the deceleration behavior, and maintain a near-zero orientation of the body during the constant speed behavior.

In various embodiments, a magnitude of the shift and/or tilt is a function of and/or proportional to a rate of acceleration or deceleration of the vehicle.

In various embodiments, the shifting assembly is configured to tilt the body relative to the chassis in a range of up to ±10 degrees relative to a vertical vehicle axis.

In various embodiments, the shifting assembly is configured to shift the body relative to the chassis in a range of up to ±100 millimeters relative to a vertical vehicle axis.

In accordance with another aspect of the inventive concepts, provided is a method of communicating behaviors by a self-driving vehicle. The method comprises providing a self-driving vehicle comprising a plurality of wheels coupled to a chassis, a body coupled to a shifting assembly that is coupled to the chassis, a drive system comprising one or more drive motors arranged to drive one or more of the wheels, a body control system comprising one or more attitude motors arranged to drive the shifting assembly. According to the method, at least one processor controls the one or more attitude motors to perform shifting and/or tilting of the body to communicate behaviors of the vehicle based on operation of the one or more drive motors.

In various embodiments, the plurality of wheels consists of two wheels.

In various embodiments, the vehicle is a follower vehicle comprising one or more sensors, and the method includes the vehicle acquiring, tracking, and following a leader while it communicates the behaviors.

In various embodiments, the behaviors of the vehicle comprise an acceleration behavior and the method includes tilting the body to have a non-zero orientation of less than 0 degrees relative to a vertical axis and a travel direction of the vehicle when the one or more drive motors accelerate the vehicle in the travel direction.

In various embodiments, the behaviors of the vehicle comprise an acceleration behavior and the method includes shifting the body rearward, e.g., up to about 100 millimeters, relative to a vertical axis and a travel direction of the vehicle when the one or more drive motors accelerate the vehicle in the travel direction.

In various embodiments, a magnitude of the shifting and/or tilting is a function of or proportional to a rate of acceleration.

In various embodiments, the behaviors of the vehicle comprise a deceleration behavior and the method includes tilting forward the body to have a non-zero orientation of more than 0 degrees relative to a vertical axis and a travel direction of the vehicle when the one or more drive motors decelerate the vehicle in the travel direction.

In various embodiments, the behaviors of the vehicle comprise a deceleration behavior and the method includes shifting the body forward, e.g., up to about 100 millimeters, relative to a vertical axis and a travel direction of the vehicle when the one or more drive motors decelerate the vehicle in the travel direction.

In various embodiments, a magnitude of the shifting and/or tilting is a function of and/or proportional to a rate of deceleration.

In various embodiments, the behaviors of the vehicle comprise a pause behavior and the method includes maintaining the body at a near-zero tilt orientation and/or a near-zero shift orientation relative to a vertical axis of the vehicle when the vehicle is not traveling.

In various embodiments, the behaviors of the vehicle comprise an acceleration behavior, a deceleration behavior, and a constant speed behavior and the method includes shifting and/or tilting the body rearward during the acceleration behavior, shifting and/or tilting the body forward during the deceleration behavior, and maintaining a near-zero orientation of the body during the constant speed behavior.

In various embodiments, a magnitude of the shifting and/or tilting is a function of or proportional to a rate of acceleration or deceleration of the vehicle.

In various embodiments, the method further comprises the shifting assembly confining the tilting of the body relative to the chassis in a range of up to ±10 degrees relative to a vertical vehicle axis.

In various embodiments, the method further comprises the shifting assembly confining the shifting of the body relative to the chassis in a range of up to ±100 millimeters relative to a vertical vehicle axis.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings:

FIG. 6A is a side view of the shifting assembly of FIG. 3, in accordance with aspects of the inventive concepts;

FIG. 7A a perspective view of an embodiment of a portion of the shifting assembly of FIG. 3, in accordance with aspects of the inventive concepts;

FIG. 7B a side view of the portion of the shifting assembly of FIG. 7B, in accordance with aspects of the inventive concepts;

FIG. 8A a perspective view of an embodiment of a portion of the shifting assembly of FIG. 3, in accordance with aspects of the inventive concepts;

FIG. 8B a side view of the portion of the shifting assembly of FIG. 7A, in accordance with aspects of the inventive concepts;

DESCRIPTION OF PREFERRED EMBODIMENTS

Figure 1:
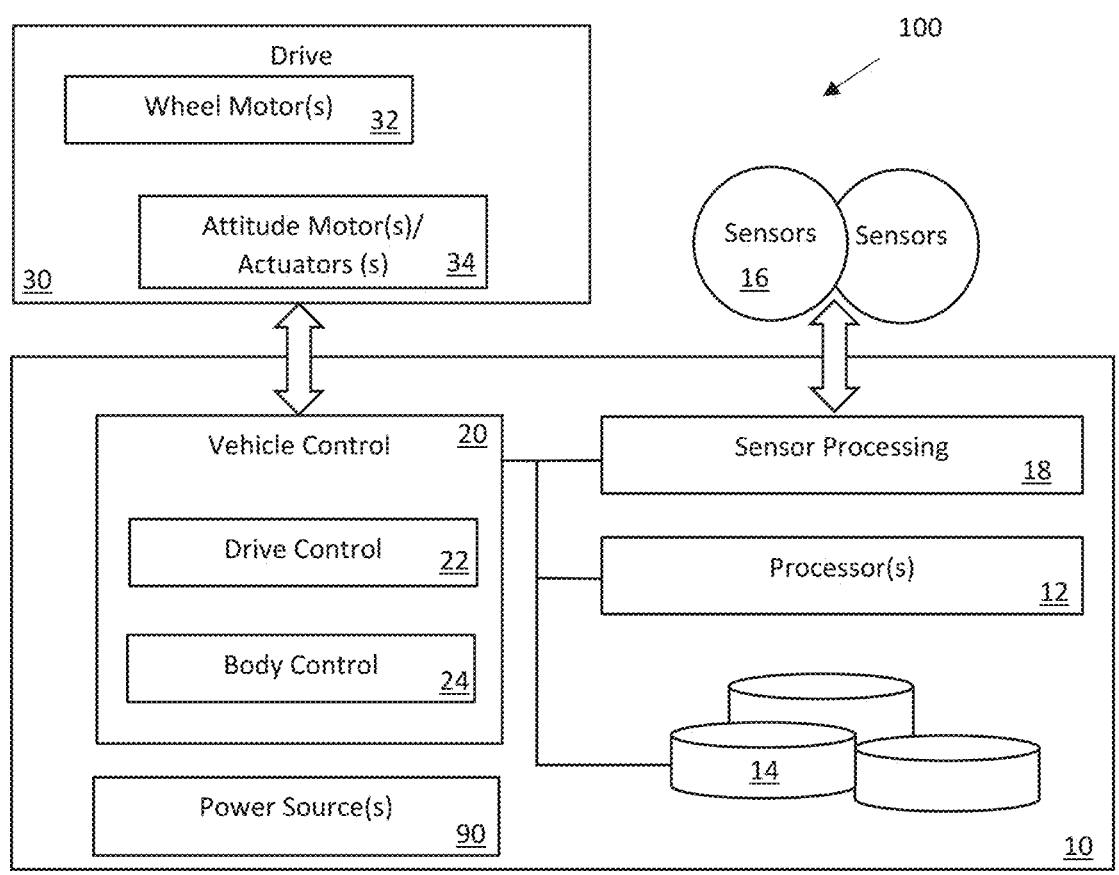
FIG. 1 is a block diagram of a self-driving vehicle, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

A growing number of vehicles are self-driving vehicles (or mobile robots) for use in a variety of personal and commercial applications. Typical self-driving vehicles use three, four, or six wheels to provide propulsion and steering control. Such vehicles rely on static stability and are designed for stability in all operating conditions based on the location of the wheels. A separation distance in the longitudinal, or backwards and forwards, direction balances out applied torques due to gravity or inclines experienced by the vehicle during normal operation (e.g., braking, acceleration, and deceleration). The greater the separation distance (wheelbase), the more resilient to disruptions along the longitudinal axis the vehicle will be.

An alternate approach involves a two-wheeled self-driving vehicle with the wheels located in a lateral, or side-by-side, orientation. Two-wheeled vehicles are inherently less stable than vehicles having three or more wheels. However, a two-wheeled vehicle can be significantly more maneuverable if the two wheels are decoupled such that they are independently propelled. The turning radius can be as small as one half the distance between the wheels if one wheel is propelled forward and the other backward, or to a greater degree by increasing a difference in speed between the inner and outer wheels of the turn. However, the challenge of using such a two-wheeled vehicle with the wheels located in the lateral, or side-by-side, orientation is that the vehicle must be dynamically stabilized to maintain the vehicle's vertical orientation, which is a requirement for most applications. Propulsion of such a laterally-mounted, two-wheeled vehicle may be accomplished by applying torque at the center of the vehicle's wheel(s) with a motor, potentially with a gearbox to optimize motor performance. Alternatively to a hub drive, the wheels could be propelled with a rim drive or at some other location of the wheel. In a rim drive configuration, the motor driven gear or belt engage the rim of the wheel rather than center hub of the wheel.

In accordance with aspects of the inventive concepts, dynamic stabilization, also referred to as active balancing, is a technique in which a control system actively maintains the stability of the vehicle while it is operating, e.g., driving, turning, and so on. In various embodiments, in a laterally-wheeled vehicle a pitch orientation of the vehicle is continually sensed and a correcting torque is applied. In various embodiments, there are two primary approaches to applying such a correcting torque, either (1) via the wheel motors themselves or (2) via the motion of a counterweight moving forward and backward in the longitudinal direction of the vehicle.

In the various implementations, dynamic stabilization is achieved via both the motor torque and a movable counterweight. However, in contrast to previously developed stabilization systems, rather than using a separate counterweight, in various embodiments of the inventive concepts, the wheels can be driven to move relative to the body of the vehicle as a whole, such that the body and chassis act as the counterweight. This allows significantly more control authority, as over half of the vehicle mass can be used for the lever arm. One artifact of this approach is that the propulsion force causing rotation of the wheel is applied at the center of the wheel, instead of using a rim drive alone. The so-called hub drive can be driven by a motor integrated into or positioned beside the wheel. Each wheel can be independently controlled. Depending on the various implementations described herein, the wheel-to-motor mass ratio can be as little as $\frac{1}{3}$ of the total vehicle mass, allowing $\frac{2}{3}$ of the mass for control.

In various embodiments, the robotic vehicle can be a "follower" vehicle, e.g., a vehicle that is configured to auto-navigate as it follows a leader. In other embodiments, the vehicle can be another type of autonomous, driverless, or robotic vehicle.

In accordance with various aspect of the inventive concepts, as a follower vehicle, navigation may be accomplished in a "following" mode in which the self-driving vehicle (or mobile robot) is virtually or wirelessly linked to a human or another vehicle as a "leader." The robotic vehicle's navigation is responsive to the leader's travel and other actions. As a follower vehicle, the vehicle can engage in behaviors that are complementary to behaviors of a leader, rather than merely copying or mimicking the leader behaviors. In engaging in complementary behaviors, the follower vehicle can utilize sensors to sense and interpret leader movements and behaviors and can also sense and interpret structures or other elements in the environment. Such structures can include, but are not limited to, doors (or doorways), elevators, vestibules, partitions, walls, stairs, steps, curbs, and so forth, as examples.

In some embodiments, the self-driving vehicle's navigation may be accomplished via an "autonomous" mode in which the vehicle travels without a leader between waypoints, which can be preset waypoints. In some embodiments, the self-driving vehicle can have at least a follower mode and an autonomous mode. In the various modes, active obstacle detection and avoidance is implemented. Both indoor and outdoor operation can be achieved using visual SLAM (simultaneous localization and mapping) technologies and approaches. And dynamic stabilization is performed by the self-driving vehicle, at least while the vehicle is in motion.

In some embodiments, dynamic stabilization is performed by the robotic vehicle while the robotic vehicle is in a temporary pause state. In some embodiments, the orientation of the body relative to the wheels can be different in a pause state than it is in a rest state or driving states. The rest state can be an indefinite state where balancing is not actively performed, while the pause state is preferably a temporary state between segments of the vehicle's navigation, e.g., while the vehicle awaits the leader or awaits clearance of an obstacle or traffic.

The pause state can have a duration of not more than 5 minutes, in some embodiments. In some embodiments, the pause state can have a duration of not more than 1 minute. In some embodiments, the pause state need not have a predefined time limit or duration. In some embodiments, the self-driving vehicle can automatically transition itself from the pause state to the rest state after expiration of an internal or external clock, e.g., when an internal clock reaches a time limit. In some embodiments, the self-driving vehicle can transition from the pause state to the rest state based on a visual queue from the leader, after receipt of a wireless signal, and/or after actuation of an onboard user interface device. In some embodiments, the self-driving vehicle can transition from the rest state to the pause state based on a visual queue from the leader, after receipt of a wireless signal, and/or after actuation of an onboard user interface device.

In accordance with aspects of the inventive concepts, the self-driving vehicle can use attitude control to communicate behaviors (e.g., actions and/or intentions) of the vehicle to bystanders. The communicative behaviors, which can be implemented through attitude control, includes movements and postures (or poses) of the vehicle and/or portions thereof that are indicative of a behavior (operation or action) in-progress or to be taken by the vehicle. The behaviors of the vehicle are communicative in that they are easily interpreted by human bystanders as signaling an in-progress or imminent operation of the vehicle. In some embodiments, the behaviors of the vehicle are communicative in that they are easily interpreted by other vehicles, robots, or other systems. In various embodiments, the communicative behaviors can include vehicle body movements that are undamped, substantially undamped, and/or exaggerated to explicitly signal the behaviors and/or behavioral intentions (e.g., imminent actions) of the vehicle. In various embodiments, attitude control is used to shift, tilt, rotate, or otherwise cause relative movement between the vehicle body and wheels to overtly communicate vehicle behaviors to bystanders, referred to as body dynamics. In various embodiments, a shifting assembly confines the tilting of the body relative to a chassis and a vertical axis of the vehicle in a range of up to ±20 degrees relative to the axis or, in other embodiments, in a range of up to ±10 degrees relative to the axis. In various embodiments, a shifting assembly confines the shifting of the body relative to a chassis and a vertical axis of the vehicle in a range of up to about ±100 millimeters relative to the axis.

FIG. 1 is a block diagram of a vehicle 100 configured to perform communicative behaviors, in accordance with aspects of the inventive concepts. The vehicle 100 may comprise a combination of sensors, motors/actuators, and executable computer algorithms that carry out the communicative behaviors of the vehicle using body dynamics, e.g., through relative shifting, tilting, and/or leaning the body relative to the wheels of the vehicle.

In various embodiments, the vehicle 100 includes a control system 10, including computer logic, processors, and/or computer storage components that cooperatively operate with various vehicle subsystems to implement the communicative behaviors of the vehicle 100. In various embodiments, the vehicle subsystems include, but are not necessarily limited to, one or more sensors 16. In a follower vehicle, the sensors 16 can detect and acquire a leader and maintain sensing, tracking, and recognition of the leader throughout the following operation. The sensors can also operate to sense, recognize, and/or detect environmental elements, such as structures (e.g., walls, doors (or doorways), elevators, etc.), other stationary objects or obstacles (e.g., furniture, bystanders, etc.), and/or moving objects or obstacles, (e.g., traffic). In some embodiments, the environmental elements could include elements related to terrain, temperature, precipitation, wind, and so forth. In some embodiments, the elements related to terrain could include surface conditions, materials, textures, and/or properties, such as grade or traction, as examples.

The sensors 16 can include vehicle-based (on-board) sensors and/or off-vehicle (off-board) sensors that are in communication with the vehicle's control system 10. Such sensors 16 can include, but are not limited to, one or more cameras, including stereo cameras, and/or light detection and ranging systems (Lidar), and/or other range detectors, as examples. In some embodiments, the sensors 16 can include one or more sensors that detect and/or measure yaw, pitch, and/or roll, e.g., such gyro sensors or other pitch sensors.

The vehicle 100 can also include one or more drive system 30. The drive system 30 can include one or more wheel motors 32 that engage and drive one or more wheels of the vehicle. In some embodiments, the vehicle includes at least two wheels driven by at least two independently controlled motors, with at least one independently controlled motor for each wheel. In various embodiments, the drive system 30 can include one or more attitude motors and/or actuators 34 that operate to control the attitude of the body of the vehicle, e.g., to control the yaw, pitch, and/or roll of the body. In some embodiments, the body can be secured to a chassis and/or counter weight that move together. In some embodiments, the chassis can be used as a counterweight. In some embodiments, the vehicle can include at least one counterweight that is movable by the attitude motors/actuators 34 to adjust and control relative movement between the one or more wheels and the body, and thereby control yaw, pitch, and/or roll of the body.

In some embodiments, the control system 10 can include one or more processors 12, at least one sensor processing module 18, one or more computer storage devices 14, and a vehicle control module 20. The one or more processors 12 can be configured to control the coordination and management of the various elements of the control system 10. The computer storage devices 14 can include program code executable by the vehicle's processors 12 to operatively control the various functions of the vehicle and its subsystems. The sensor processing module 18 can be configured to control communication with the sensors 16, as well as control operations of the sensors and process sensor data, although some processing and sensor control may be accomplished by processors 12. The sensor data can include, embody, or represent data received by the sensors 16 and, in some embodiments, can also include sensor models that can be stored in computer storage devices 14. In some embodiments, a sensor model can be a set of parameters and/or settings used for operating a sensor 16. In some embodiments, a sensor model can be a data set that represents errors and/or inaccuracies introduced by a sensor. In either case, a sensor model can be sensor-specific. A sensor model can be used, therefore, by the processors 12 and/or sensor processing module 18 to calibrate a sensor, interpret sensor data, and/or correct sensor data acquired by the sensors 16. A sensor model can, in some embodiments, be updated dynamically over time using sensor data acquired by one or more of the sensors 16 during operation of the vehicle and communicated via feedback to the processors 12 and/or sensor processing module 18 to update and refine the sensor models based on real-world, operationally-sensed data.

Figure 2A:
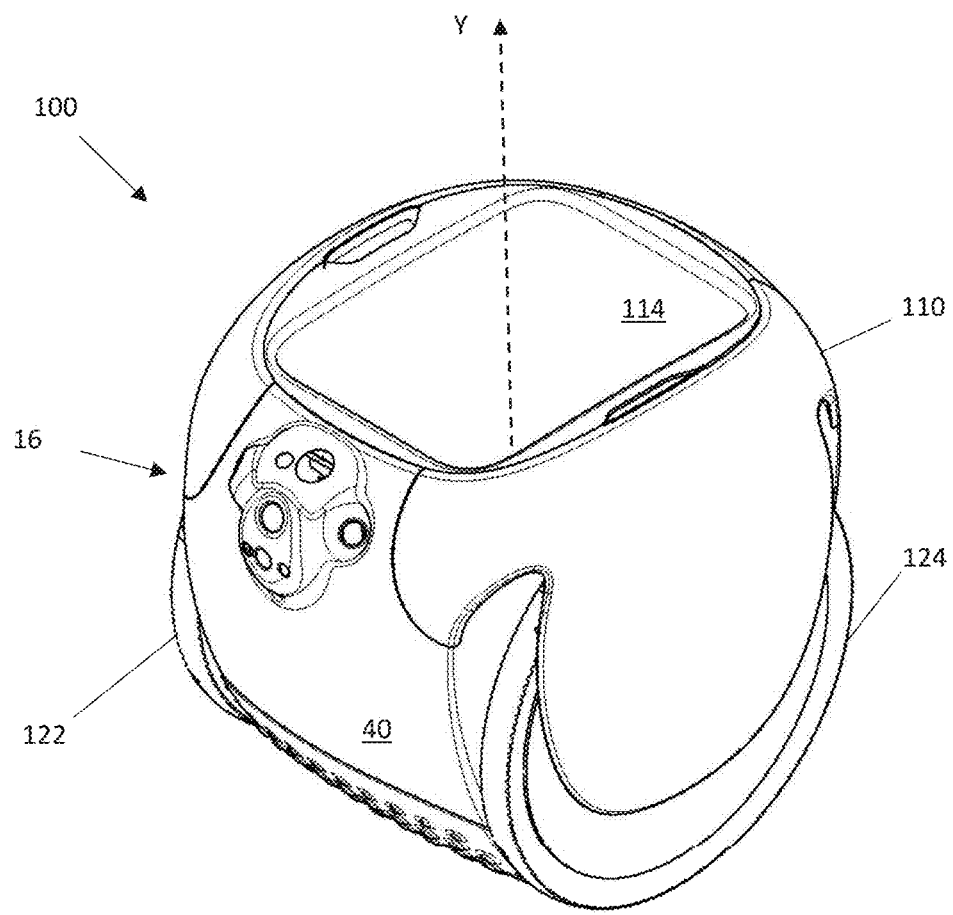
FIG. 2A is a perspective view of an embodiment of a self-driving vehicle, in accordance with aspects of the inventive concepts.
Figure 2B:
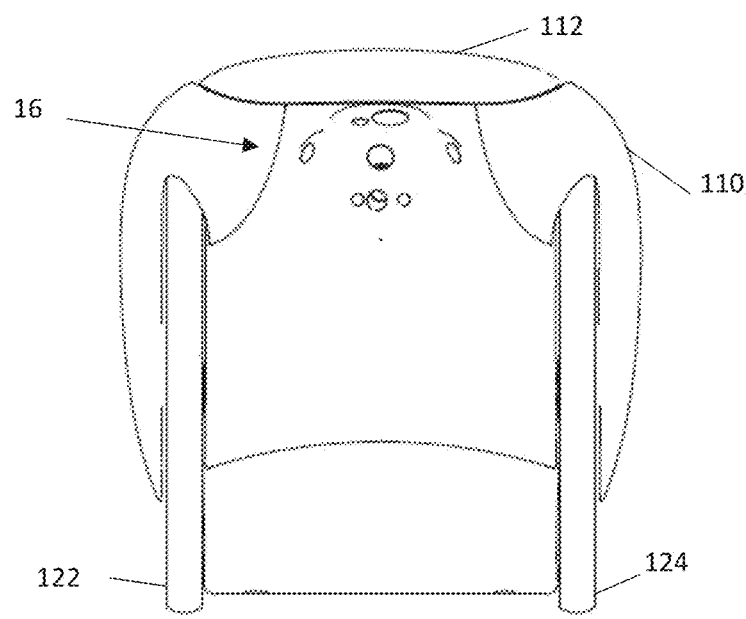
FIG. 2B is a front view of the self-driving vehicle of FIG. 2A, in accordance with aspects of the inventive concepts.
Figure 2C:
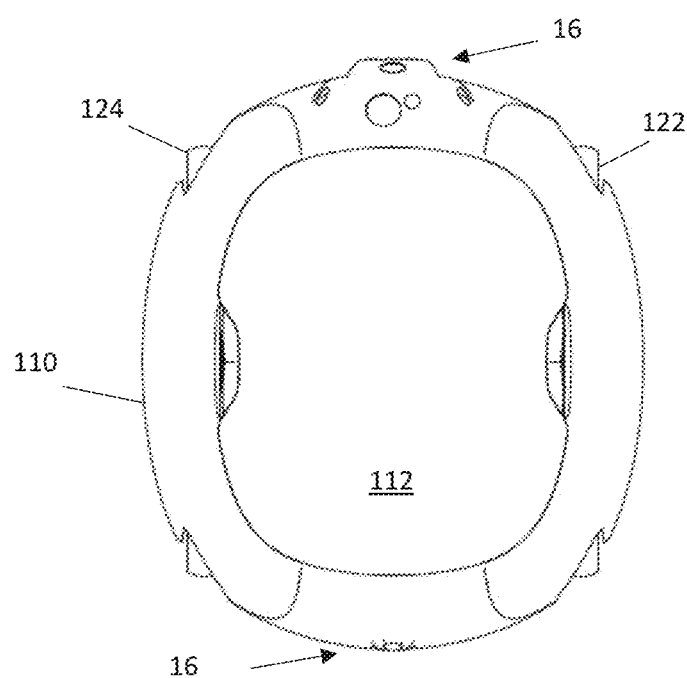
FIG. 2C is a top view of the self-driving vehicle of FIG. 2A, in accordance with aspects of the inventive concepts.

Referring also to FIGS. 2A through 2C, the vehicle control module 20 can be configured to send control signals to the drive system 30, which can include one or more motors configured to drive the vehicle wheels 122, 124 and implement communicative behaviors by moving, shifting, and/or tilting the vehicle body 110 relative to the wheels and a vertical axis "Y." The vehicle control module 20 can include a drive control module 22 and a body control module 24. The drive control module 22 can be configured to send control (or drive) signals to the wheel motor(s) 32 to drive rotation of the vehicle wheels 122, 124 in the forward or backward directions. Through controlled rotation of the wheels, the drive control module 22 drives the wheel motors 32 to cause the vehicle 100 to accelerate, decelerate, pause, stop, and turn.

The body control module 24 can be configured to control movement of the body 110 relative to the wheels 122, 124 through operative control of at least one attitude motor (or actuator) 34. In various embodiments, the body 110 is attached to the chassis so that the body and chassis move together. But in other embodiments, the chassis can remain in a relatively constant orientation and the body can be moved relative to the chassis and wheels.

The vehicle 100 in FIGS. 2A through 2C is a two-wheeled vehicle, but in other embodiments the vehicle could have a different number of wheels. For the exemplary two-wheeled vehicle, the wheels 122, 124 are oriented side-by-side, or laterally, with one wheel on each side of the vehicle body and in parallel. Such a vehicle is particularly maneuverable if the two wheels are functionally decoupled, such that they are independently controlled and propelled by different motors 32. The turning radius can be as small as the one half the distance between the wheels, if one wheel is propelled forward and the other backward, or greater by increasing the difference in speed between the inner and outer wheel of the turn.

In various embodiments, the body 110 can include at least one cargo compartment or volume 116. The vehicle 100 can include a lid 112 that covers the cargo compartment 116. In some embodiments, the cargo compartment 116 can be fully or partially located between the wheels 122, 124.

The two-wheeled, self-driving vehicle 100 with its wheels oriented in the parallel, or side-by-side, configuration must be dynamically stabilized to maintain the vehicle's vertical orientation, which is a requirement for most applications. Propulsion of such a laterally-mounted, two-wheeled vehicle may be accomplished by applying torque at the center of the vehicle wheel(s) with at least one motor 32, potentially with a gearbox between the at least one motor and one or both of the wheels to optimize motor performance. Alternatively, the wheels 122,124 could be propelled with a rim drive, where a motor drives one or more gears that engage a rim of a wheel rather than a hub of the wheel; this assembly can be implemented for each of the wheels 122, 124. In a rim drive embodiment, the motors that drive the wheels are disposed off-axis with respect to an axis of rotation of the wheels 122, 124. Such a configuration can provide room for the cargo compartment 116 or other structure or apparatus between the wheels.

In various embodiments, the communicative behaviors can be accomplished by the control system 20 actively moving, shifting, and/or tilting the body 110 relative to the wheels 122, 124, referred to as body dynamics. The type, amount, and speed or rate of moving, shifting, and/or tilting of the body relative to the wheels can be a function of, or be dependent on, the operation of the vehicle by the drive control module 22. Vehicle drive operations can include driving at a steady speed, accelerating, decelerating, or turning in a forward or reverse direction, pausing, resting, or transitioning between those operations. Transitioning can also include transitions within such operations, such as accelerating, decelerating, or turning at a first rate and then transitioning within the same accelerating, decelerating, or turning operation to a second rate that is different from the first rate. The body dynamics communicate behaviors to bystanders by posing or orienting the body relative to the wheels to reflect the operations and, in some case, the transitions of the vehicle.

In various embodiments, a magnitude of the shift and/or tilt of the body 110 relative to the wheels 122, 124 is a function of and/or proportional to a rate of acceleration or deceleration of the vehicle, which can be accomplished by the vehicle control system 20 (and processor 12) driving the wheel motors 32. In some embodiments, the processor 12 can cause the body control system 24 to implement proportional shifting and/or tilting based on a drive signal to the drive control system 22.

In various embodiments, therefore, the body dynamics also move, shift, and/or tilt the cargo volume 116, as part of the body, with respect to the wheels. In other embodiments, the cargo volume 116 can remain fixed or otherwise have an orientation that is substantially stable and unaltered by the body dynamics. That is, movement of the cargo volume 116 need not be caused by movement of the body 110. In such a case, the cargo volume can be supported such that it "floats" with respect to the body and, therefore, does not substantially move relative to the central vertical axis Y.

In a laterally-wheeled vehicle, such as vehicle 100, a pitch orientation of the vehicle can be continually sensed and a correcting torque can be applied to adjust the attitude of the body. In various embodiments, there are two primary mechanisms for applying such a correcting torque, either (1) via the wheel motors 32 themselves or (2) via the motion of a counterweight moving forward and backward in the longitudinal direction of the vehicle under control of the attitude motors/actuators 34. Therefore, the correcting torque can be applied via the vehicle control system 20 and the drive system 30, e.g., by the body control module 24 and attitude motors/actuators 34 and/or by the drive control module 22 and the wheel motors 32.

Accordingly, in the various embodiments, communicative behaviors are achieved via a shifting assembly that includes both the motor torque and a counterweight to shift the body to communicate behaviors, which is controlled by the vehicle control module 20 operatively controlling the drive system 30. In various embodiments, the body moves relative to the wheels of the vehicle, such that the body and, in some embodiments, the chassis act as the counterweight. This allows significantly more control authority, as over half of the vehicle mass can be used for the level arm. Each wheel can be independently controlled, each having a different motor 32. In various embodiments, the wheel-to-motor mass ratio can be as little as ⅓ of the total vehicle mass, allowing ⅔ of the mass for control.

FIGS. 3 through 8B illustrate different views of a linear shifting assembly 130 that can be used on implement body dynamics, in accordance with principles of the inventive concepts. In this embodiment, the wheels 122, 124 are driven by motors 132a,b at their hubs, on the axis of rotation of the wheels. The vehicle 100 includes a chassis 150 that is the structural frame of the vehicle 100, and supports the body 110, which forms a protective shell of the vehicle 100.

Figure 4:
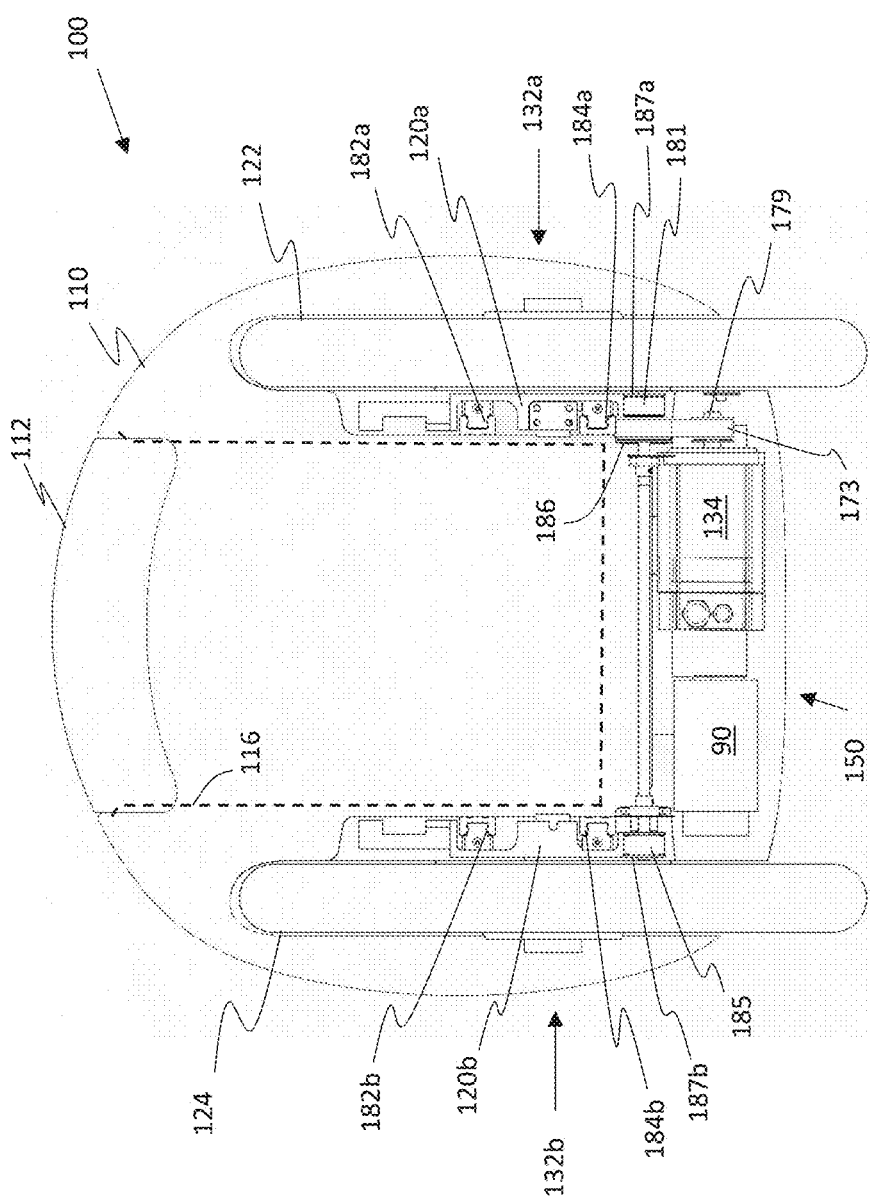
FIG. 4 is a rear view of a self-driving vehicle including the shifting assembly of FIG. 3, in accordance with aspects of the inventive concepts.

In some implementations, the vehicle 100 further includes wheel carriages 120a,b, as best shown in FIG. 4. The wheel carriages 120 are moveably coupled to, and longitudinally displaceable relative to, the chassis, as will be discussed in further detail below. The wheel carriages 120a,b are configured such that a wheel, e.g., wheel 122, and its corresponding motor 132 may be rotatably coupled thereto. As will be described in further detail below with reference to FIGS. 6A through 6C, as an example, a wheel carriage is coupled to a linear actuator system that allows the wheel carriage to translate back and forth in the longitudinal direction of the chassis, in order to control a pitch and balancing of the chassis 150. For example, as the wheel carriage is translated by the linear actuator system, the corresponding wheel, which is mounted on the wheel carriage, translates along with the wheel carriage relative to the chassis. This causes a relative translation of the chassis 150 in the opposite direction, thereby acting as a counterweight, and adjusting the pitch and center of gravity of the chassis. In this embodiment, therefore, there is provided the advantage of using the actual body of the vehicle 100 to act as a counterweight and maintain a near-zero pitch angle by moving or shifting the chassis 150 relative to the wheels, e.g., wheel 122 and/or wheel 124.

In an embodiment, the vehicle includes the first wheel 122 and the second wheel 124 are disposed on opposite sides of the vehicle body 110. As discussed above, the first wheel 122 may be rotationally mounted on a first wheel carriage 120a and coupled to the chassis 150 through the first wheel carriage 120a. Similarly, the second wheel 124 may be rotationally mounted on a second wheel carriage 120b and coupled to the chassis 150 through the second wheel carriage 120b. The first and second wheels 122 and 124 each include a geometric center and a diameter. The size of the wheels can vary depending on the needs for torque, ground clearance, and the desired location of the center of gravity relative to the center of rotation of the vehicle 100. Preferably, however, the first and second wheels are the same size. In some aspects, the size of the vehicle 100 may vary between 12 inches to 30 inches in height, with similar widths. In the illustrated embodiments, the diameters of the wheels 122 and 124 are shown to be smaller than the length and height of the vehicle 100. However, the various implementations of the inventive concepts are not limited thereto. In some instances, the opposite could apply. That is, the diameter of the wheels 122 and 124 may be larger than the length and height of the vehicle 100.

In some embodiments, the diameter of the wheels 122 and 124 can be between 12 and 28 inches, inclusive. In certain embodiments, the diameter of the wheels 122 and 124 is at least 75% of the height, length, and width of the vehicle 100. Each wheel 122 and 124 may also include a rim substantially defining an outer surface of the wheel 122 and 124. A tire 103a,b may be disposed around each rim 101a,b. The tires 103a,b may be mounted to the respective rims 101a,b, such that each tire rotates with its rim. Collectively, a tire and rim form a wheel. The tire may be made from a rubber, polymer, or any other suitable material and may, in some embodiments, be solid. The tires may provide frictional contact between the wheel 122 and 124 and a ground surface to enhance the performance of the vehicle 100.

Figure 5:
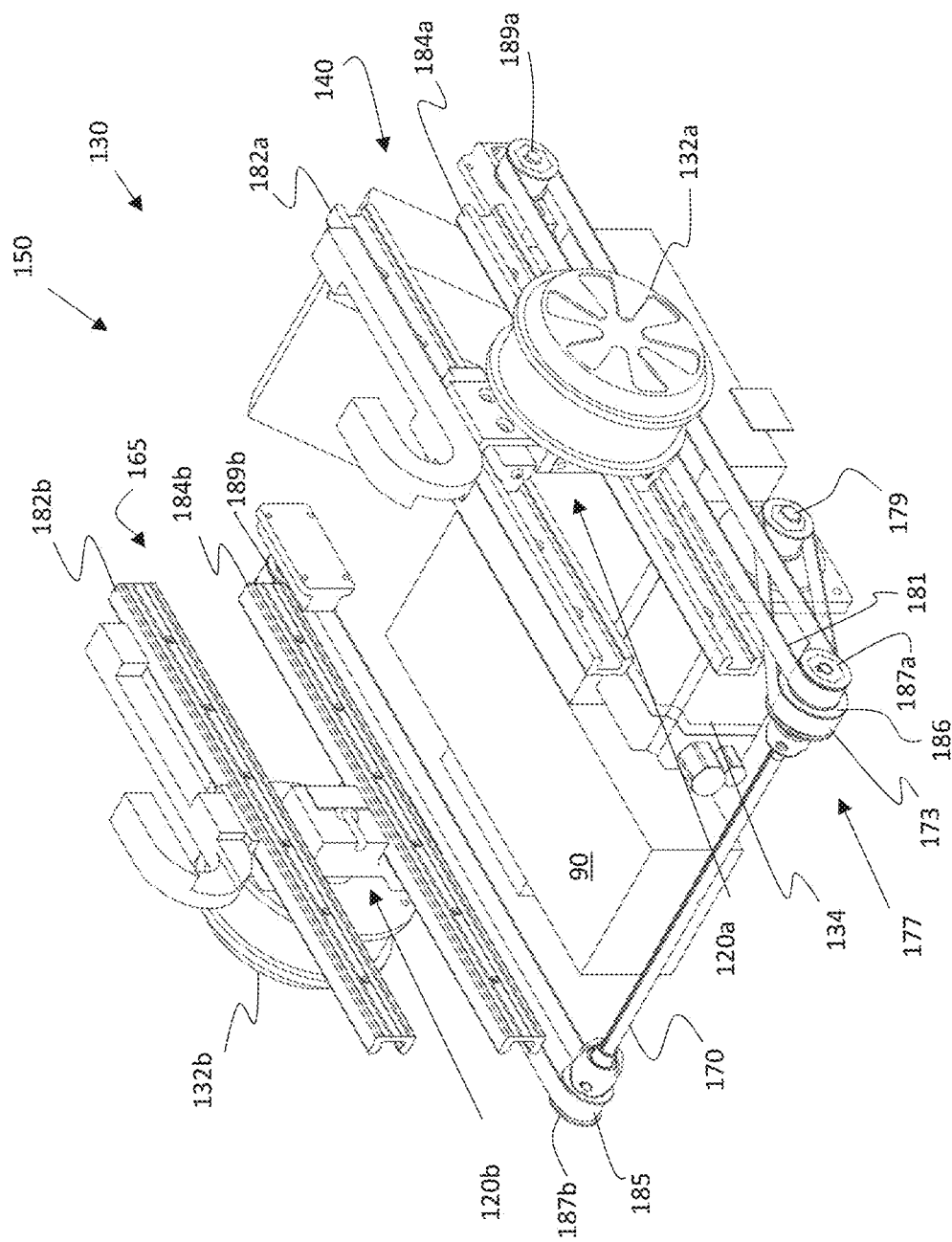
FIG. 5 is another perspective view of portions of the shifting assembly of FIG. 3, in accordance with aspects of the inventive concepts.

FIG. 5 illustrates another perspective view of various components of a linear shifting system 130 of the vehicle 100, according to aspects of the inventive concepts. In this view, the tires and rims are omitted. As illustrated in FIG. 5, the vehicle 100 may further include a first linear actuator system 140. The first linear actuator system 140 may be coupled to the first wheel carriage 120a, and adapted to longitudinally displace the first wheel carriage 120a, including wheel 124, relative to the chassis 150.

The vehicle 100 may further include a second linear actuator system 165, the structure and function of which is similar to that of the first linear actuator system 140. That is, the second linear actuator system 165 may be coupled to the chassis 150 at a side opposite to the first linear actuator system 140. For example, the first linear actuator system 140 may be positioned at a left side of the vehicle 100 whilst the second linear actuator system 165 may be positioned at a right side of the vehicle 100, or vice versa. The second linear actuator system 165 may similarly be configured to longitudinally displace the second wheel carriage 120b relative to the chassis 150.

An axle 170 couples the first linear actuator system 140 to the second linear actuator system 165. Similar to the first and second wheels 122, 124, in the case of the first and second actuator systems, where described using the term "second", each of the "second" elements connects, and functions, in substantially the same manner as the termed "first" element.

In some implementations, a third motor 134a may be coupled to at least one of the first and second linear actuator systems 140 and 165 to drive the first and second linear actuator systems 140 and 165. In some implementations, each of the first and second linear actuator systems 140 and 165 may include first and second pulleys 187 and 189. The first and second linear actuator systems 140 and 165 may each further include at least one rail coupled to the chassis 150 along the longitudinal direction thereof. In some implementations, the at least one rail includes upper and lower rails 182 and 184, each coupled to the chassis 150. Each of the upper and lower rails 182 and 184 includes longitudinal slots extending therethrough, where the respective first and second wheel carriages 120a and 120b are translated through rotation of the first and second pulleys 187 and 189. The first and second wheel carriages 120a and 120b may each include one or more edge wheels coupled into the rails to facilitate movement of the wheel carriages 120a and 120b back and forth along the rails with reduced friction. In some other implementations, the first and second linear actuator systems include only one rail on each side of the chassis.

The first and second linear actuator systems 140 and 165 each further include respective belts 181 and 185 disposed along outer circumferences of the first and second pulleys 187 and 189. In some aspects, the belts 181 and 185 couple the first and second pulleys 187 and 189 to each other. The belts 181 and 185 are configured to transmit power from the third motor 134 to longitudinally displace the respective first and second wheel carriages 120a,b relative to the chassis 150.

In accordance with some implementations, the belts 181 and 185 may be removably attached to the outer circumference of the each of the pulleys 187 and 189, such that a rotation of pulleys 187 and 189 caused by rotational energy delivered from the third motor results in motion of the belt. The belts 181 and 185 may be formed of a metal, metal alloy, ceramic, polymer, rubber, composite material or any other suitable material. In some implementations, chains may be used instead of the belts 181 and 185, and a cogwheels may be used instead of the pulleys 187 and 189. The first and second wheel carriages 120a,b are each coupled to a respective belt 181, 185 such that motion of the belts 181, 185 causes a corresponding motion of each of the first and second wheel carriages 120a,b relative to the chassis 150, in the longitudinal direction. As will be described below in more detail, motion of the first and second wheel carriages 120a,b causes the respective wheel assemblies, including the motors 132a,b, to translate back and forth in the longitudinal direction relative to the rest of the vehicle 100. The effect of this is to translate the chassis 150 (and the body) in the opposite direction to which the wheel carriages 120a,b with their respective wheels 122 and 124 are translated.

In operation, the first and second pulleys 187 and 189 are driven by a drive pulley system 177 which is connected directly to the third motor 134 via a drive belt 173. Rotational energy of the motor 134 is transferred from a drive pulley 179 to a drive pulley 186 of the drive pulley system 177 through the belt 173 of the drive pulley system 177. The drive pulley 186 of the drive pulley system 177 then transfers rotational energy from the belt 173 to each of the pulleys 187 and 189 of the first and second linear actuator systems 140 and 165.

FIG. 6A is a side view illustrating a linear actuator system 140, 165 of the linear shifting assembly 130 and various components of a wheel assembly including a hub motor, according to aspects of the inventive concepts. As illustrated in FIG. 6A, the vehicle 100 may further include the first motor 132a integrated into the first wheel 122, and coupled to the first wheel carriage 120a. The motor 132a may be coupled to the first wheel carriage 120a through a first shaft 135, and configured to provide drive energy to the first wheel 122. The motor 132a is powered by receiving electrical energy from a fuel cell or battery 90 (shown in FIG. 5). The battery 90 may be positioned centrally, on a bottom surface of the chassis 150. In some embodiments, the motor 132a is a hub motor which is mounted directly in the center of the first wheel 122. To this effect, the motor 132a is configured with a stator 152 including a series of stationary coils disposed thereon. The stator can couple directly to the first wheel carriage 120a, through which electric current is provided to the coils. The motor 132a may further include a rotor 154 which is integrated into the first wheel 122. The rotor 154 may be configured to include a series of magnets, and is rotationally mounted about the stator 152 to rotate around the stator 152 as applied current from the battery 90 generates an electromagnetic field. The first wheel 122, being integrally attached to the spinning rotor 154, rotates along with the spinning rotor 154.

Figure 3:
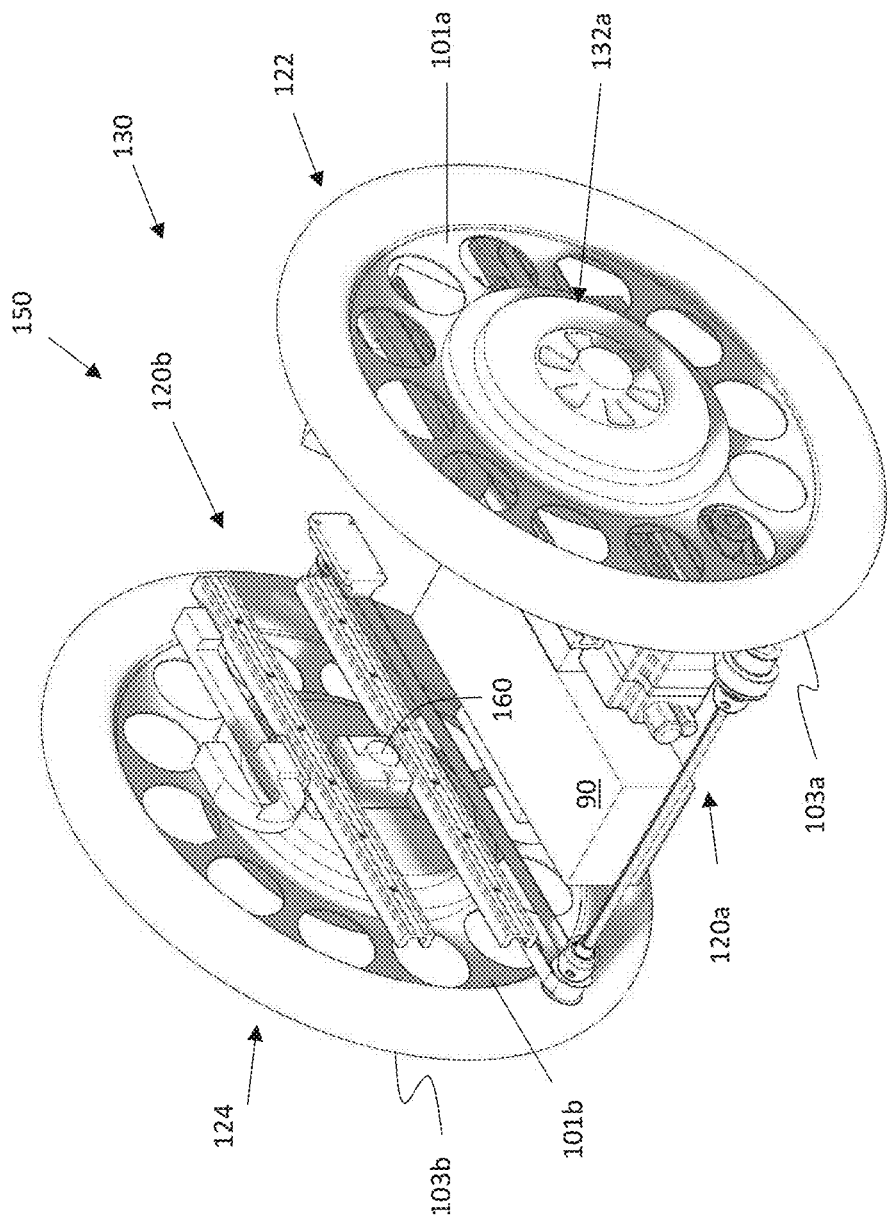
FIG. 3 is a perspective view of an embodiment of a shifting assembly, in accordance with aspects of the inventive concepts.

The vehicle 100 may further include a second motor 132b integrated into the second wheel 124, and coupled to the second wheel carriage 120b, as best shown in FIGS. 3 and 5. Similar to the first motor 132a, the second motor 132b may be attached to the second wheel carriage 120b through a second shaft 160, and configured to provide drive energy to the second wheel 124. The second motor 132b is also powered by receiving electrical energy from the fuel-cell or battery 90. As discussed above with respect to the first motor 132a, the second motor 132b may similarly be a hub motor which is mounted directly in the center of the second wheel 124. To this effect, the second motor 132b may similarly be configured with a stator and a spinning rotor which are structured and which function similar to the stator 152 and rotor 154 of the first motor 132a. Similar to the first and second wheels, in the case of the first and second motors, where described using the term "second," each of the "second" elements connects, and functions, in substantially the same manner as the termed "first" element.

Figure 6B:
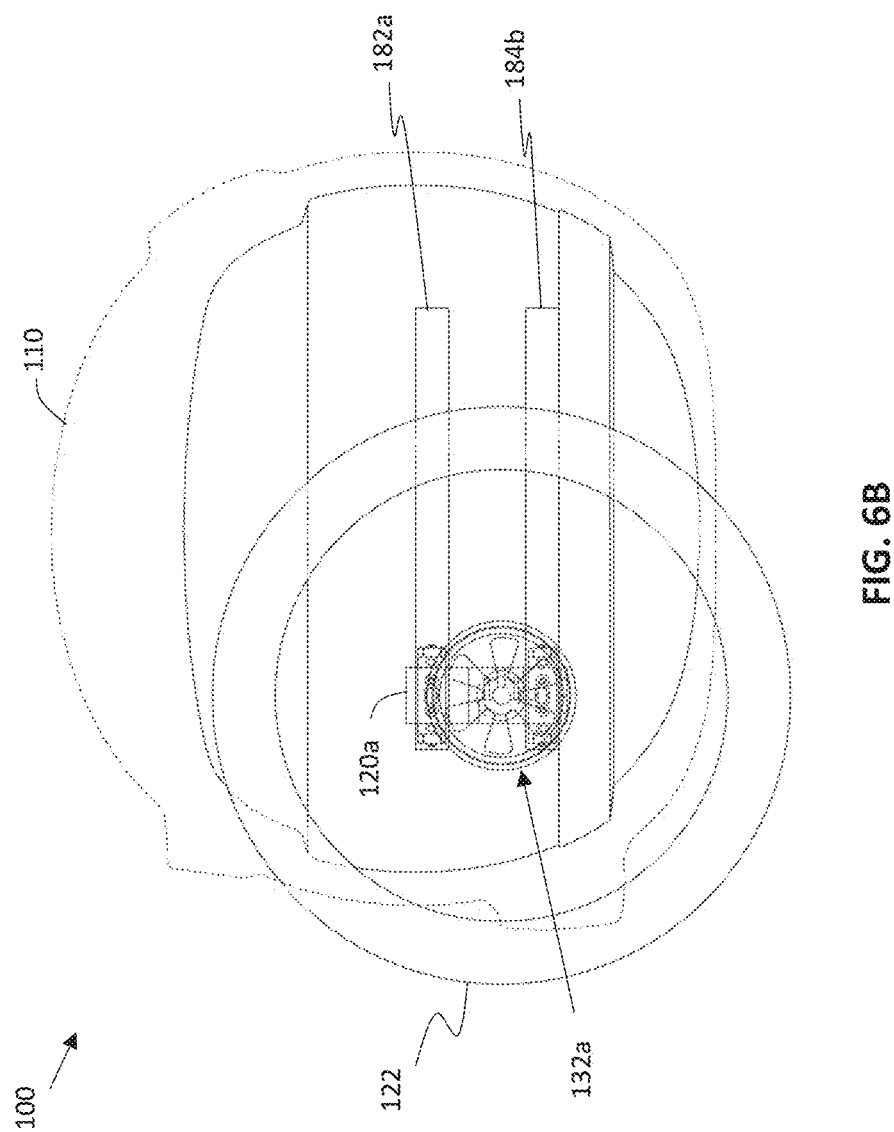
FIG. 6B is another side view of the shifting assembly of FIG. 3, in accordance with aspects of the inventive concepts.
Figure 6C:
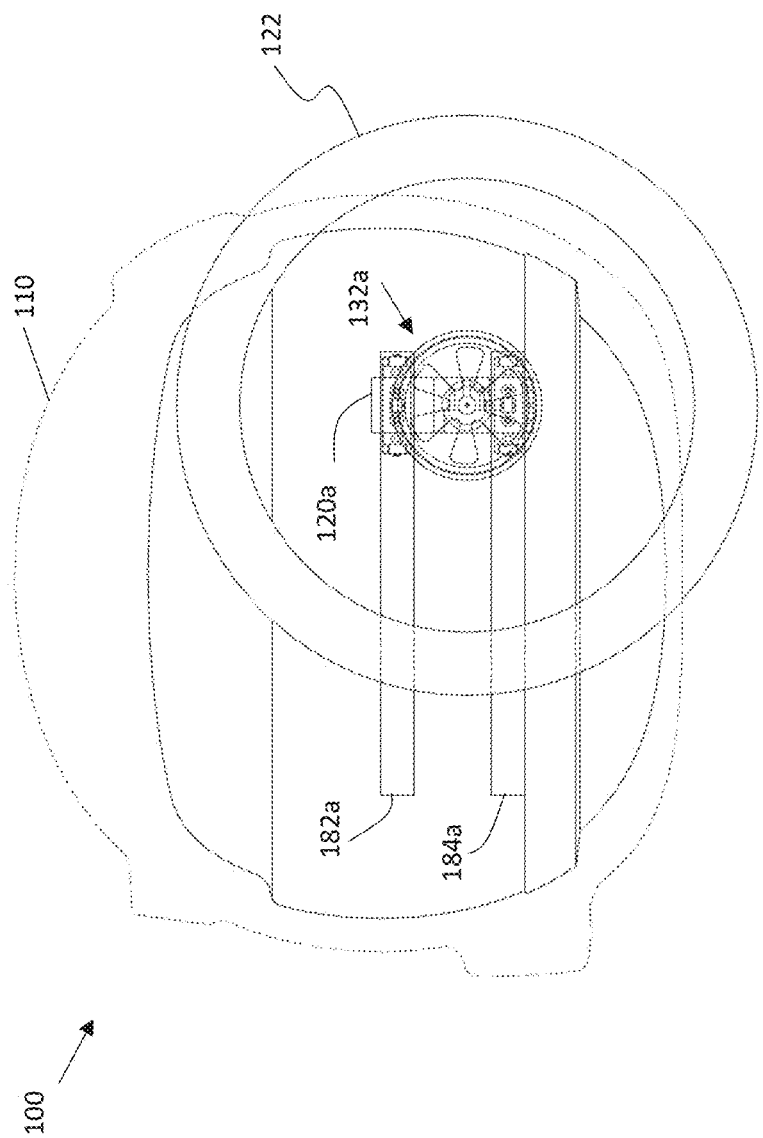
FIG. 6C is another side view of the shifting assembly of FIG. 3, in accordance with aspects of the inventive concepts.

FIG. 6B is a view illustrating a maximum rearward position of the wheel and carriage relative to the chassis of the vehicle and FIG. 6C is a view illustrating a maximum forward position of the wheel and carriage relative to the chassis of the vehicle, according to aspects of the inventive concepts. In accordance with some embodiments, each of the linear actuator systems 140 and 165 allow the respective wheel assemblies including the hub motors 132a,b to translate back and forth in the longitudinal direction relative to the rest of the vehicle 100. The effect of this is to translate the chassis 150 (and the body 110) in the opposite direction to which the wheel carriages 120a,b with their respective wheels 122 and 124 are translated. In some aspects of the inventive concepts, each of the first and second linear actuator systems displaces its respective first and second wheel carriages relative to the chassis, e.g., at speeds of up to 300 mm/sec. Thus, aspects of the inventive concepts provide the advantage of having available the weight of the entire chassis 150 (and battery 90) of the vehicle 100 to act as a counterweight to balance and dynamically stabilize the vehicle 100 and maintain the vertical orientation of the laterally mounted vehicle 100.

FIG. 7A illustrates a perspective view of various components of another embodiment of a shifting assembly 180 having first and second linear actuator systems 163, 167 that can be used with the vehicle 100, according to aspects of the inventive concepts. FIG. 7B illustrates a side view of the various components of the second linear actuator system of FIG. 7A. The chassis 150 is not shown, but would be disposed between the first and second linear actuator systems 163, 167 and the first and second linear actuator systems 163, 167 would be coupled to the chassis to effect relative shifting and/or tilting between the body 110 and the first and second wheels 122, 124.

As illustrated in FIG. 7A, the vehicle 100 may include the first and second linear actuator systems 163 and 167, in place of first and second linear actuator systems 140 and 165. The first and second linear actuator systems 163, 167 each includes upper and lower rails 182*a,b* and 184*a,b* that define longitudinal slots extending along their respective lengths. Each of the first and second linear actuator systems 163, 167 further includes a wheel carriage 169*a,b* to which the first and second wheels 122,124 are coupled via respective drive motors 132*a,b*. The wheel carriages 169*a,b* are configured to travel in the slots defined by their respective upper and lower rails, to thereby shift relative to the chassis 150.

In the embodiments, of FIGS. 7A and 7B, the first linear actuator system 163 includes a third motor 172 instead of the third motor 175 in FIG. 6A. In some embodiments, the third motor 172 may be shared by the first and second linear actuator systems 163, 167 to effect common shifting and/or tilting movement of both wheels 122, 124. In other embodiments, each linear actuator motor could have its own motor (see also fourth motor 171). When each linear actuator system 163, 167 has its own motor, wheels 122, 124 may be shifted together or shifted differently, e.g., in different directions and/or to different degrees.

Similar to the configuration of the first and second linear actuator systems 140 and 165, each of the first and second linear actuator systems 163 and 167 may include first and second pulleys 187 and 189 and upper and lower rails 182*a,b* and 184*a,b*, each of the rails being coupled to the chassis 150. For each linear actuator, one pulley 187*a,b* is mounted at one end of the bottom rail 184*a,b* and the other pulley 189*a,b* is located at the other end of the lower rail 184*a,b*. The pulleys 187*a,b* and 189*a,b* are coupled to the lower rails 184*a,b* so they can rotate, e.g., by a pin or bolt.

The third motor 172 is mounted to the chassis 150 at a position between the first and second pulleys 187*a* and 189*a*. The third motor includes a pulley 183*a*, which it rotates. The first linear actuator system 163 further includes belt 181 disposed at an outer circumference of the first and second pulleys 187*a*,189*a* and motor pulley 183*a*. The first wheel carriage 169*a* is translated through rotation of the first and second pulleys 187*a* and 189*a* by motor pulley 183*a*, which is driven by motor 172.

The second linear actuator 167 include a second belt 185 that travels around the first and second pulleys 187*b* and 189*b*.

In some embodiments, the belts 181 and 185 couple the first and second pulleys 187*a,b* and 189*a,b* to each other. An axle similar to the axle 170 shown in FIG. 5 can couple the first pulleys 187*a,b* of the first and second linear actuator systems 163 and 167 to each other, so that rotational energy of the third motor 172 may be transmitted to both the first pulleys 187*a,b* of the first and second linear actuator systems 163 and 167. In such embodiments, the belts 181 and 185 are configured to transmit power from the third motor 172 to longitudinally displace the respective first and second wheel carriages 169*a,b* relative to the chassis 150.

In some embodiments, the second linear actuator system 167 may include a separate fourth motor 171 to drive the second linear actuator system 167 cooperatively and/or independently of the first linear actuator system 163. The fourth motor 171 may function similarly to the any of the aforementioned third motors 172 and 134, and may be coupled to an side of the chassis 150 opposite that of the third motor 172. In these implementations, the belt 181 is configured to transmit power from the third motor 172 to longitudinally displace the first wheel carriage 169*a* relative to the chassis 150. The belt 185 is configured to transmit power from the fourth motor 171 to longitudinally displace the second wheel carriage 169 relative to the chassis 150 within rails 182*b* and 184*b*.

In accordance with some implementations, the belts 181 and 185 may be removably attached to the outer circumference of the each of the pulleys 187*a,b* and 189*a,b*. A rotation of pulleys 187*a,b* and 189*a,b* caused by rotational energy delivered from the third and/or fourth motors 172 and/or 171 via pulleys 183*a,b* results in motion of the belts 181 and/or 185. In some implementations, the third and fourth motors 172 and 171 may be synchronized to provide synchronized motion of the first and second linear actuator systems 163 and 167.

As described above with respect to the FIG. 3, motion of the first wheel carriage 169*a* and the second wheel carriage 169*b* causes the respective wheel assemblies including the motors 132*a,b* to translate back and forth in the longitudinal direction relative to the rest of the vehicle 100. The effect of this is to translate the chassis 150 with the body 110 in the opposite direction to which the first wheel carriage 169*a* and the second wheel carriage 169*b* with their respective wheels 122 and 124 are translated.

FIG. 8A illustrates a perspective view of various components of another embodiment of a linear actuator system 190 of the vehicle 100, in accordance with aspects of the inventive concepts. FIG. 8B illustrates a side view of the various components of a linear actuator system 190 of FIG. 8A.

As illustrated in FIG. 8A, the vehicle 100 may include first and second linear actuators 188 and 191, in place of first and second linear actuator systems 140 and 165. The vehicle 100 may include a third motor 171, as in FIG. 7A. In some implementations, the third motor 171 may be coupled at a first end to at least one of the first and second linear actuator systems 188 and 191 to drive at least one the first and second linear actuator systems 188 and 191. The third motor 171 may also be mounted at an end thereof to the chassis 150.

Similar to the configuration of the first and second linear actuator systems 163, 167, each of the first and second linear actuator systems 188 and 191 may include first pulleys 187*a,b* and upper and lower rails 182*a,b* and 184*a,b*, each coupled to the chassis 150 (not shown). The third motor 171 is mounted to the chassis 150 and includes a motor pulley 183*b*. The first and second linear actuator systems 188 and 191 may each further include respective belts 181 and 185. In the second linear actuator system 191, belt 185 is disposed at outer circumferences of the first pulley 187*b* and the motor pulley 183*b*. The first linear actuator system 188 can include a fourth motor 172 and motor pulley 183*b* from FIG. 7A, in some embodiments, or a passive (not-driven) pulley like 189*a* from FIG. 7A, in other embodiments.

Each of the upper and lower rails 182*a,b* and 184*a,b* includes longitudinal slots extending therethrough, within which the respective first and second wheel carriages 169*a,b* are translated through rotation of at least the first 187*b* via motor pulley 183*b* driven by third motor 171 and, optionally, through rotation of the first 187*a* via motor pulley 183*a* driven by fourth motor 172.

In some aspects, the belt 181 couple the first 187*b* and the motor pulley 183*b* and belt 185 coupled first pulley 187*a* with a motor pulley 183*a* or a passive pulley 189*a*. An axle similar to the axle 170 may couple together the first pulleys 187*a,b* of the first and second linear actuator systems 188 and 191, so that rotational energy of the third motor 176 may be transmitted to rotate both the second pulleys 189*a,b* of the first and second linear actuator systems 188 and 191, in some embodiments. The belts 181 and/or 185 are configured to transmit power from the third motor 176, via motor pulley 183*b*, to longitudinally displace and translate the respective first wheel carriage 169a and, optionally, the second wheel carriage 169b within the slots formed by rails 182a, 184a relative to the chassis 150.

However, in some embodiments, the first linear actuator system 188 may include a separate fourth motor 172 that is similar to motor 171 to drive the first linear actuator system 188 independently of the second linear actuator system 191. The fourth motor 172 may function similarly to the any of the aforementioned third motors 171. In these implementations, the belt 185 is configured to transmit power from the third motor 176, via a motor pulley 183a to longitudinally displace and translate the second wheel carriage 169 within the slots formed by rails 182a, 184a relative to the chassis 150. The belt 181 is configured to transmit power from the fourth motor (not shown) to longitudinally displace the first wheel (not shown) relative to the chassis 150.

In accordance with some implementations, the belts 181 and 185 may be removably attached to the outer circumference of the each of the pulleys 187a,b and 183a,b, such that a rotation of pulleys 187 and 189 caused by rotational energy delivered from the third and/or fourth motors results in motion of the belts 181 and/or 185. In some implementations, the third and fourth motors may be synchronized to provide synchronized motion of the first and second linear actuator systems 188 and 191.

Motion of the first wheel carriage 169a and the second wheel carriage 169b causes the respective wheel assemblies including the motors 132a,b to translate back and forth in the longitudinal direction relative to the rest of the vehicle 100. The effect of this is to translate the chassis 150 (and the body) in the opposite direction to which the first wheel carriage 169a and the second wheel carriage 169b with their respective wheels 122 and 124 are translated.

In accordance with some other embodiments, the various first and second linear actuator systems may include or be selected from the group consisting of a ball screw, a roller screw, a voice coil, a rack and pinion, a hydraulic cylinder, and a pneumatic cylinder.

Figure 9:
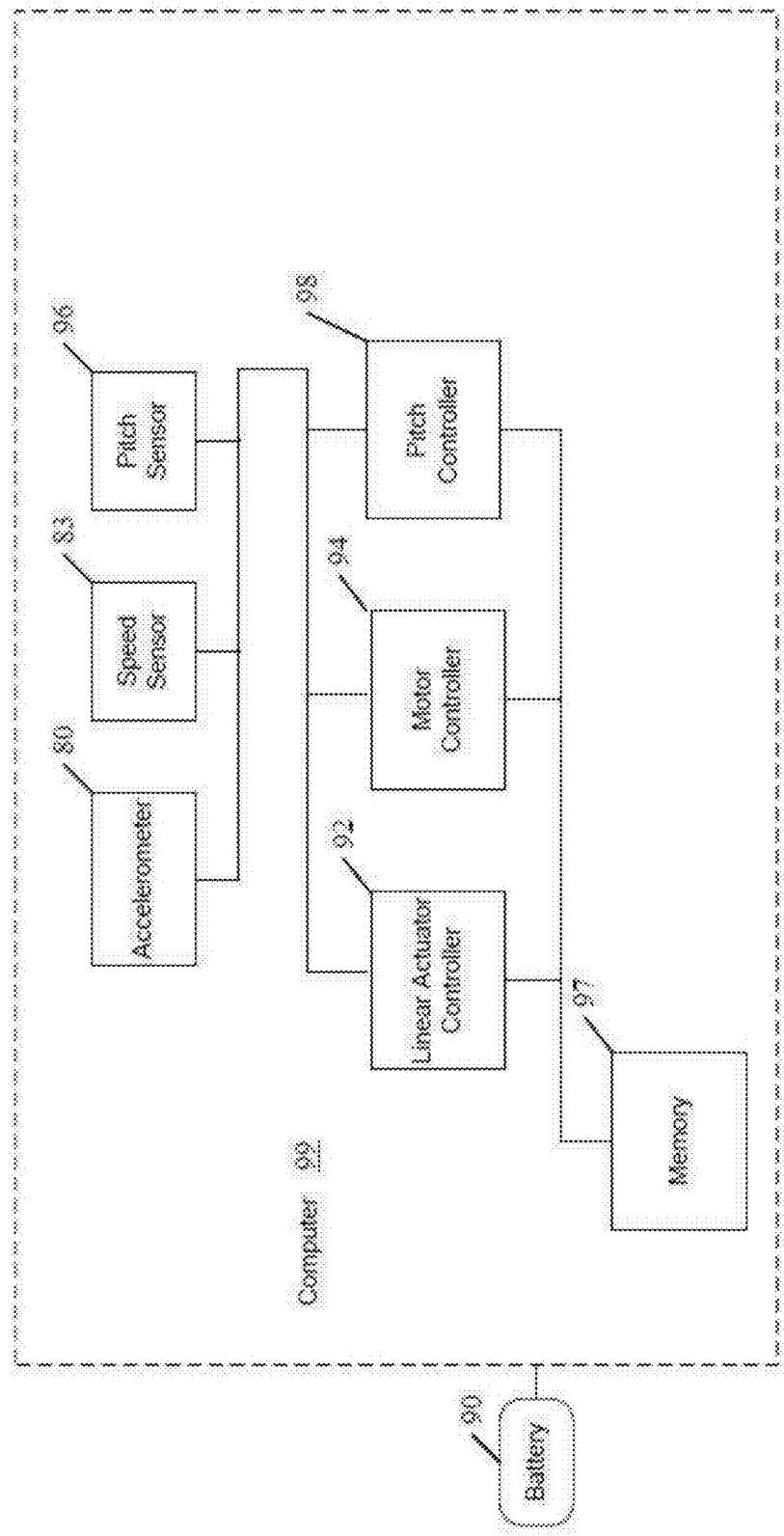
FIG. 9 is an illustration of a functional block diagram of another embodiment of a control system of a self-driving vehicle, in accordance with aspects of the inventive concepts.

FIG. 9 provides an exemplary electrical block diagram of a control system 99 that can be used to control various aspects of the vehicle 100, in accordance with aspects of the inventive concepts. The vehicle 100 includes one or more sensors, as described above. In some embodiment, the one or more sensors may include two ultrasonic sensors for vehicle autonomous navigation. The one or more sensors may include the pitch sensor 96 for sensing the pitch of the vehicle 100, the body, and/or chassis 150. The one or more sensors may also include an accelerometer 80 for sensing an acceleration of the vehicle 100 and/or chassis 150. The one or more sensors may also include a speed sensor 83 for sensing a speed of the vehicle 100 and/or chassis 150. One or more of the sensors 80, 83, and 96 may be disposed and/or secured on an outer surface of the chassis 150 (or body 110). The computer 99 may further include a linear actuator controller 92, a motor controller 94, a pitch controller 98 and a memory 97 (like computer storage 14 of FIG. 1) in electronic communication with at least one of the sensors 80, 83, and 96. In some embodiments, the computer 99 may include a proportional-integral-derivative controller (PID controller) or PID-based controller which applies a control loop feedback mechanism to continuously modulate control of the orientation or pitch of the chassis 150 and/or body 110 of the vehicle 100. In other aspects, the pitch controller may include the PID controller to continuously modulate and correct and/or control the pitch angle of the chassis 150 and maintain stability of the vehicle 100.

In other embodiments, controlled adjustments can be made where the pitch angle of the body 110 can be greater than or less than zero to communicate the behaviors of the vehicle using body dynamics in accordance with aspects of the inventive concepts. The range of the pitch angle can be up to ±20 degrees in some embodiments, e.g., and in some embodiments can be constrained to a range of about ±10 degrees. In some embodiments, the controlled adjustments can provide both near-zero pitch angle during some operations (e.g., constant speed and/or pause) and provide non-zero pitch angle body dynamics during other operations (e.g., acceleration and deceleration).

In accordance with some embodiments, a method for dynamically controlling a two-wheeled vehicle 100 includes measuring, by the at least one sensor 80, 83, and 96, disposed on the chassis 150, a pitch of the chassis 150 relative to the horizontal during operation of the vehicle 100, and outputting a pitch signal based thereon. The method further includes controlling, by the pitch controller 98, responsive to pitch signal output of the at least one sensor 80, 83, and 96, at least one of the first and second linear actuator systems to displace at least one of the first and second wheel carriages longitudinally relative to the chassis 150 to control chassis orientation relative to the horizontal in various moving and non-moving states, e.g., "sitting" (stopped position) and/or pausing.

The one or more sensors 80, 83, and 96 determine and output a measurement of a state of the vehicle 100 and/or chassis 150. The determination is sent to the memory 97 and controller 92, which orders an operation of at least one of the third motor 75 which powers the first and second linear actuator systems 40 and 65. For example, the pitch sensor 96 determines a pitch of the vehicle 100 and/or chassis 15 and outputs the measured pitch to the memory 97 and controller 92, which commands an operation of the third motor 134. In this manner the vehicle 100 can determine, by controller is 92, 94, and 98 and based on sensors 80, 83, and 96 data, an orientation, acceleration or speed of the vehicle 100 and/or chassis 150. In some implementations, the sensors 80, 83, and 96 can make multiple determinations at different times or continuously to determine a change in orientation, acceleration or speed of the vehicle 100 and/or chassis 150, or rate of change in orientation, acceleration or speed of the vehicle 100.

In some embodiments, once the above determination of an orientation, acceleration or speed, or of a change (or rate of change) in the orientation, acceleration or speed, of the vehicle 100 and/or chassis 150 is made, the controller 92 and/or memory 97 control the third motor 134 to move at least one of the first and second linear actuator systems in response to the measured determination. In various embodiments, during at least one operation, the controller 92 and/or memory 97 control the third motor 134 to move at least one of the first and second linear actuator systems to maintain a substantially constant vehicle 100 and/or chassis 150 orientation about a lateral axis of the vehicle 100 and/or chassis 150. In various embodiments, during at least one operation, the controller 92 and/or memory 97 control the third motor 134 to move at least one of the first and second linear actuator systems to cause the vehicle 100 and/or chassis 150 to have a non-zero orientation about a lateral axis of the vehicle 100 and/or chassis 150 that communicates vehicle behaviors.

Thus, each of the linear actuator systems allow the respective wheel assemblies including the hub motors 132a,b to translate back and forth in the longitudinal direction relative to the rest of the vehicle 100. The effect of this is to translate the chassis 150 (and the body 110) in the opposite direction to which the wheel carriages with their respective wheels 122, 124 are translated. Thus, the present disclosure provides the advantage of having available the weight of the entire chassis 150 of the vehicle 100 to act as a counterweight to balance and dynamically stabilize the vehicle 100 and maintain the vertical orientation of the laterally mounted vehicle 100 in some operations and non-zero orientations in other operations.

As described above, in accordance with some aspects of the inventive concepts, controlled adjustments of the linear actuator systems allow the vehicle 100 to automatically control the pitch angle of the chassis 150, e.g., to have an orientation within plus or minus two degrees of a vertical vehicle axis "Y" and/or a horizontal axis "Z" (near-zero) for some operations and to have a non-zero orientation for other operations, to allow controlled and/or stable operation of the vehicle 100. The effect of this is to control the pitch of the chassis 150, body 110, and/or vehicle 100 at a near-zero pitch angle in some operations, e.g., during steady state movement or constant velocity, and at a non-zero pitch in other operations, e.g., acceleration and deceleration. Such body dynamics can communicate the operation or behavior of the vehicle.

The pitch angle of the chassis 150, body 100, or vehicle 100 is continually sensed using the pitch sensor 96, which may be either an inclinometer or an inertial measurement unit, as examples. In some aspects, where the autonomy and navigation computer 99 includes a PID controller instead of the pitch controller 98, the PID controller may then use the sensed data to provide a controlling torque around the center of rotation of the chassis 150 or the vehicle 100, in the plane of the wheels 122 and 124. To this effect, the PID controller continuously calculates an error value as the difference between the desired pitch angle (e.g., a near zero pitch angle or a non-zero pitch angle) and the actual measured pitch based on the instability and the operation of the vehicle 100. The PID controller 98 then applies a control factor based on proportional, integral, and derivative terms in order to minimize and/or adjust and/or control the difference in value between the desired pitch angle (e.g., near-zero or non-zero) and the sensed or measured pitch angle. Thus, in some implementations, a motion of the chassis 150 acting as a counterweight can be determined using a proportional-integral-derivative (PID) controller algorithm.

The controlling torque can be applied to control the pitch angle of the chassis 150 to a near-zero pitch angle to allow stable operation of the vehicle 100 in some operation or to allow stable operation of the vehicle with a non-zero pitch angle in other operations. The controlling torque is thus generated by the motion of the chassis 150 back and forth relative to the first and second carriages and respective wheels 122 and 124. For a given mass of the vehicle 100 (including any payload in the cargo volume 116), an increase in the offset from the center of rotation of the vehicle 100 generates a proportional increase in torque to counter the pitch moments experienced during normal operation of the vehicle 100, around the lateral axis thereof, for near-zero correction. For non-zero correction, for a given mass of the vehicle 100 (including any payload in the cargo volume 116), an increase in the offset from the center of rotation of the vehicle 100 generates a disproportional increase in torque to counter the pitch moments experienced during certain operation of the vehicle 100 such that the body pitches forward (deceleration) or rearward (acceleration) in a controlled manner within a range of motion that does not cause the vehicle body to contact the ground and does not make stability of the vehicle beyond control for the given mass. The degree or magnitude of correction and, therefore, the degree or magnitude of the body shift and/or tilt with respect to a vertical vehicle axis "Y" can be proportional to the rate of acceleration or deceleration in some embodiments.

Figure 10A:
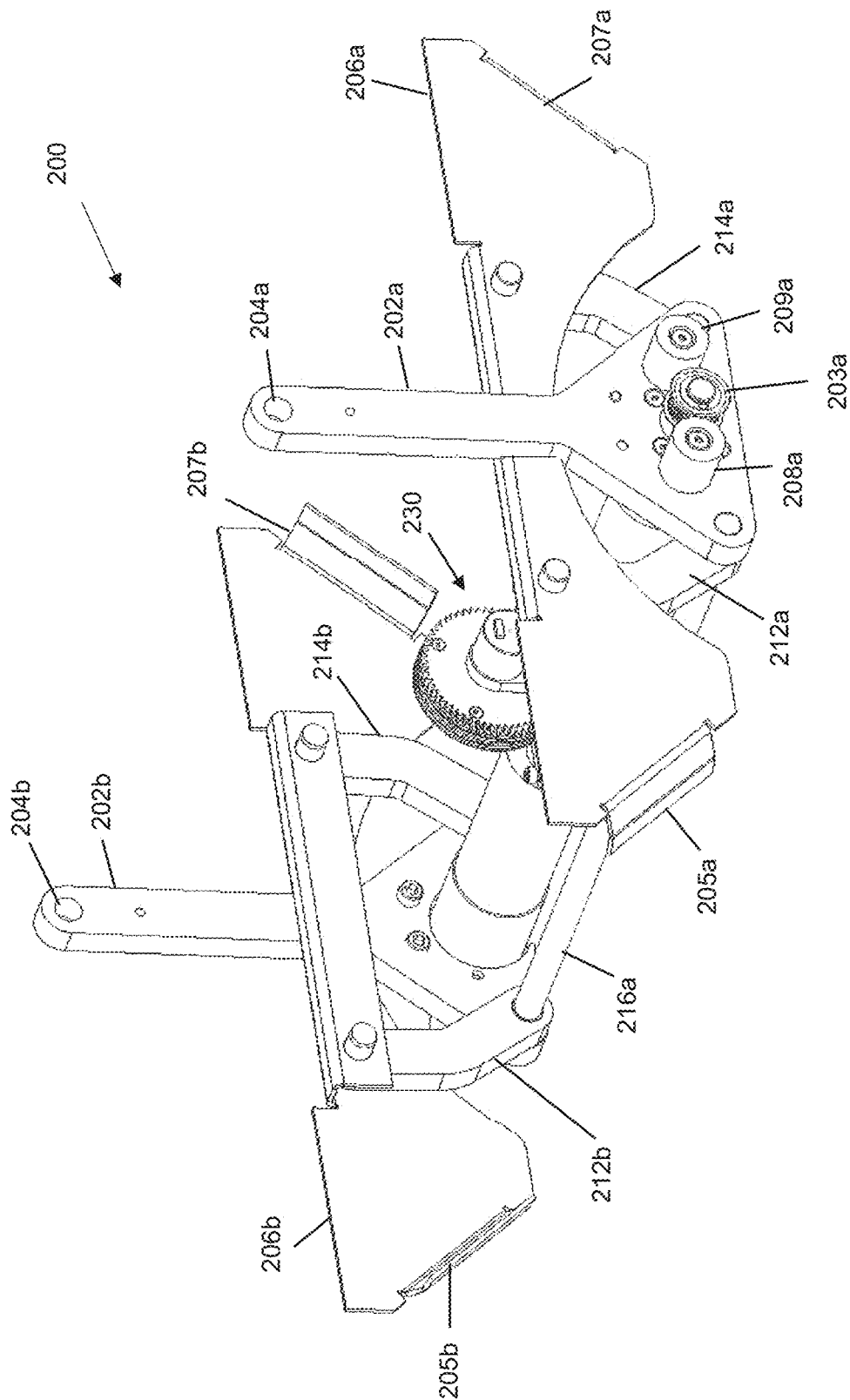
FIGS. 10A through 10C provide views of an embodiment of a linkage-based shifting assembly, in accordance with aspects of the inventive concepts.
Figure 10B:
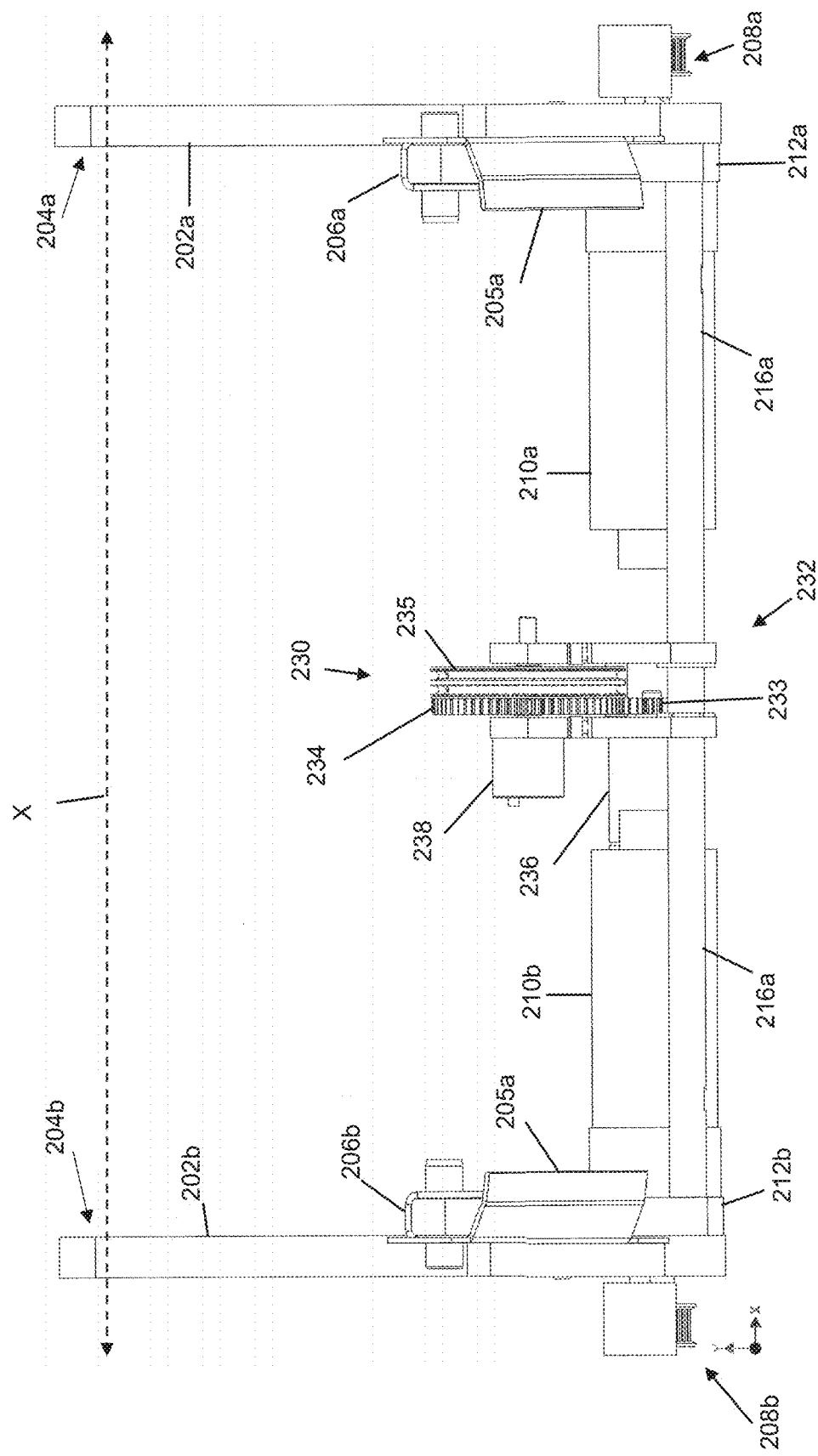
Figure 10C:
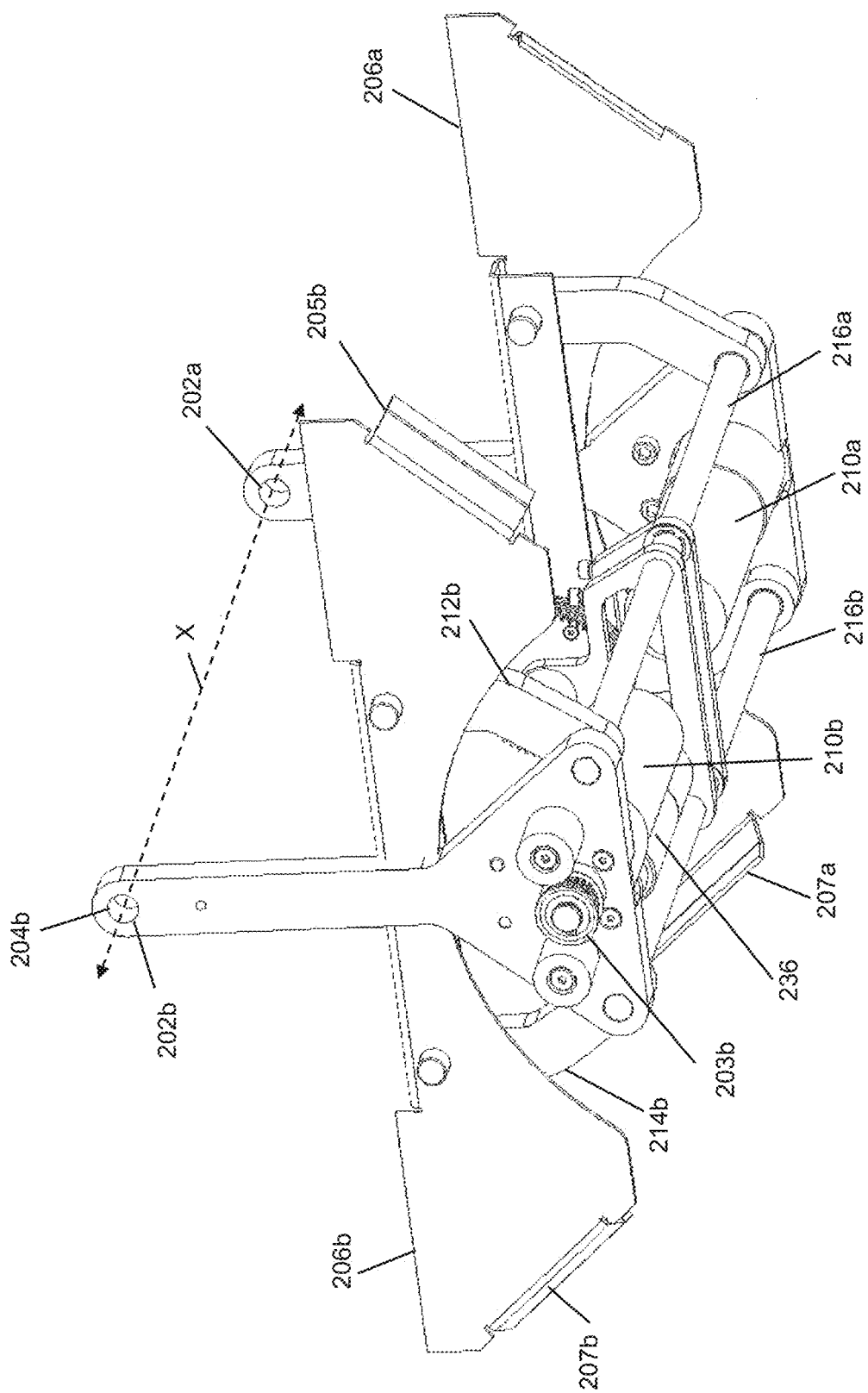

FIGS. 10A through 10C provide views of an embodiment of a linkage-based shifting assembly 200 that can form part of the vehicle 100 of FIGS. 1 and 2A-2C. The shifting assembly 200 can form part of or couple to the chassis 150. FIG. 10A provides an isometric view and FIG. 10B is a front view of the linkage-based assembly of FIG. 10A. FIG. 10C is a bottom isometric view of the linkage-based shifting assembly of FIG. 10A. The shifting assembly 200 can be an alternative to the linear shifting assemblies 130, 180, 190 of FIGS. 3 through 8B. The shifting assembly 200 can affect tilting of the body relative to a vertical vehicle axis "Y" and/or horizontal axis "Z".

The shifting assembly 200 is particularly useful for enabling and effecting shifting of the body 110 with respect to two or more vehicle wheels, e.g., wheels sharing a common access of rotation, such as wheels 122, 124. The shifting assembly 200 can form part of or support the chassis within the body 110 and move relative to the wheels. The shifting assembly can include motors and/or actuators (e.g., see 132a,b, 134 in FIGS. 3-8B) that drive the wheels and cause relevant movement between the body 110 (and chassis) and wheels 122, 124 that provide communicative behaviors—behaviors that communicate the current and/or next operations of the vehicle. By using body dynamics to alter orientation of the body through shifting and/or tilting as a function of current or imminent behaviors, the shifting assembly 200 communicates behaviors of the vehicle 100 to bystanders.

The shifting assembly 200 includes a first swing arm 202a and a second swing arm 202b, disposed on opposite sides of the shifting assembly 200. In various embodiments, the arms 202a, 202b are configured to simultaneously swing to move the body 110 with respect to the wheels 122, 124. At a proximal (or upper) end of each arm 202a, 202b is a connection structure 204a, 204b configured to couple to the wheels 112, 114. In this embodiment, the connection structure 204a takes the form of an opening configured to receive an axle of wheel 112 and the connection structure 204b takes the form of an opening configured to receive an axle of wheel 114. The connection structure openings are co-axial with an axis "X" in this embodiment (see FIG. 10B). The couplings between the wheels 122, 124 and their respective arms 202a, 202b, via the connection structures 204a, 204b, enables rotation of the wheels with respect to the arms on the axis X of rotation. In the present embodiment, there is a gap between the arms 202a, 202b, which can be used to give space to a cargo compartment 116 or other apparatus located between wheels 122, 124. In this embodiment, the motors 210a,b (similar to motors 132a,b) that drive the rotation of the tires 122, 124 do not lie on the X axis of rotation, they are off-axis to preserve the space between arms 202a, 202b for cargo compartment or other apparatus located between wheels 122, 124.

In the present embodiment, intermediate first and second support plates 206a, 206b are stationary relative to the carrier body 110. The support plates 206a, 206b can be orientated substantially parallel to the wheels 122, 124, such as in this embodiment. In this embodiment, each of the first and second support plates 206a, 206b includes a plurality of flanges 205a, 205b, 207a, 207b configured to secure the first and second support plates 206a, 206b to the body 110. The first support plate 206a includes first flange 205a and second flange 207a. And the second support plate 206b includes first flange 205b and second flange 207b.

The swing arms 202a, 202b are configured to swing in planes parallel to the support plates 206a, 206b. In this embodiment, various linkage components are disposed between the support plates 206a, 206b and wheels 122, 124. This arrangement is configured to provide maximum space for an internal storage or cargo compartment 46, payload, or equipment of the vehicle 100.

A first linkage arm 212a and a second linkage arm 214a extend from the first support plate 206a. The first linkage arm 212a and the second linkage arm 214a are rotatably coupled to the first support plate 206a. In this embodiment, the first linkage arm 212a has a proximal end rotatably coupled to the first support plate 206a and the second linkage arm 214a has a proximal end rotatably coupled to the first support plate 206a. A third linkage arm 212b and a fourth linkage arm 214b extend from the second support plate 206b. The third linkage arm 212b and the fourth linkage arm 214b are rotatably coupled to the second support plate 206b. In this embodiment, the third linkage arm 212b has a proximal end rotatably coupled to the second support plate 206b and the fourth linkage arm 214b has a proximal end rotatably coupled to the second support plate 206b.

A first linkage bar 216a couples between a distal (lower) end of the first arm 202a and a distal (lower) end of the second arm 202b. In this embodiment, the first linkage bar 216a passes through an opening at a distal end of the first linkage arm 212a to couple to the first arm 202a and passes through an opening at a distal end of the third linkage arm 212b to couple to the second arm 202b.

A second linkage bar 216b also couples between the distal end of the first arm 202a and the distal end of the second arm 202b. The second linkage bar 216b passes through an opening at a distal end of the third linkage arm 214a to couple to the first arm 202a and passes through an opening at a distal end of the fourth linkage arm 214b to couple to the second arm 202b. In this embodiment, the first and second linkage bars 216a, 216b extend along axes that are parallel to the axis X of rotation of the wheels 112, 114. The support plates 206a,b, linkage bars 212a, 212b, 214a, 214b, and the linkage bars 216a, 216b are located below the connection structures 204a,b of the first and second arms 202a,b.

First and second wheel pulleys 208a, 209a are rotatably coupled to the distal end of swing arm 202a. In this embodiment, first and second wheel pulleys 208a, 209a are disposed between the first and second linkage bars 216a, 216b. The pulleys 208a, 209a are respectively driven by a gear 203a and drive motor 210a, via at least one belt (not shown). In various embodiments, drive motor 210a is coupled to arm 202a. This configuration allows the motor 210a to stay stationary with respect to the wheel 112, wherein motor 210a is also attached to its swing arm 202a. Drive motor 210a is an embodiment of motor 32 in FIG. 1.

Similarly, third and fourth wheel pulleys 208b, 209b are rotatably coupled to the distal end of swing arm 202b. In this embodiment, the third and fourth wheel pulleys 208b, 209b are disposed between the first and second linkage bars 216a, 216b. The pulleys 208b, 209b are respectively driven by a gear 203b and drive motor 210b, via at least one belt (not shown). In various embodiments, motor 210b is coupled to arm 202b. This configuration allows the motor 210b to stay stationary with respect to the wheel 114, wherein motor 210b is also attached to its swing arm 202b. Drive motor 210b is an embodiment of motor 32 in FIG. 1.

The pulleys 208a, 209a and 208b, 209b can be configured to operatively couple to their respective wheels 122, 124 via one or more belts. The hubs of wheels 122, 124 preferably include, therefore, corresponding pulleys and gears to engage and rotate the wheels in response to motor rotation of the corresponding gear 203a, 203b. In various embodiments, a first belt (not shown) is operatively coupled between pulleys 208a, 209a and the corresponding pulley of wheel 112. Similarly, a second belt (not shown) is operatively coupled between pulley 208b, 209b and the corresponding pulley of wheel 114. As such, motors 210a, 210b are configured to independently drive wheels 112, 114 via their respective pulley and gear systems.

A shifting assembly 230 is disposed between the arms 202a, 202b and the support plates 206a, 206b. The shifting assembly 230 is configured to shift the carrier body 110 with respect to the wheels 122, 124 in an arcuate path. Unlike the linear shifting assembly 130, shifting assembly 200 enables the body to tilt forwards and backward to perform the communicative behaviors. The shifting assembly 230 includes a gear carriage 232 having a bottom portion through which the first and second linkage bars 216a, 216b pass. In this embodiment, the gear carriage 232 comprises parallel frames or plates between which is disposed a first gear 233, a second gear 234 and a windlass 235. At a bottom portion of the gear carriage 232 is the first gear 233. The second gear 234 and the windlass 235 are coaxial, and disposed at a top portion of the gear carriage 232, above the first gear 233.

At least one shifter motor 236 drives the rotational movement of the first gear 233. Shifter motor 236 is an embodiment of attitude motor/actuator 34 in FIG. 1. The first gear 233 engages and drives the second gear 234 in response to the shifter motor 236 actuation or operation. The shifter motor 235 turns the first gear 233, which in turn turns the second gear 234. Rotation of the second gear 234 causes a corresponding rotation of the windlass 235.

An encoder 238 is operatively coupled to the second gear 234 and windlass 835 and measures a rotational angle of the second gear 234. The windlass 235 winds a steel rope (not shown) that is fixed to the mobile chassis (or vehicle body 110) at both ends. Rotation of the windlass 235 via rotation of the second gear 234, which is engaged and rotated by the first gear 233, provides the shifting action of the vehicle body 110 with respect to the wheels 112, 114, by climbing the linkage assembly 230 with the drive motors 210a, 210b, and wheels 112, 114 from end-to-end of the chassis, wherein the support plates 206a, 206b attached to the chassis remain relatively stationary.

Therefore, in this embodiment, the shifter motor 236 couples to the first gear 233 to selectively shift the assembly 200 forward and rearward. Using the shifting the assembly 200, the vehicle body 110 is selectively shifted forward and rearward in a controlled manner with respect to the wheels 122, 124 and axis "X" of wheel rotation. A vehicle center can be defined as the intersection of the X, Y, and Z axes. The shifter motor is controlled by the body control module, while the wheel motors 210a, 210b are controlled by the drive control module. Accordingly, the vehicle control module 20 can control cause not only drive control module 22 of the vehicle, but also communicative behaviors through controlled body dynamics.

The vehicle 100 may take the form of a personal use or companion vehicle that cooperatively engages with at least one human user. As a companion vehicle, the vehicle 100 may take the form of a "follower" vehicle, which can be a self-driving vehicle structured and arranged to cooperatively operate with a human user (or other "leader") by implementing one or more behavior models in response to sensed conditions from the environment, stored data, and/or actions of the human user.

As a follower vehicle, the self-driving vehicle can be configured to follow a leader, such as a human leader. In various embodiments, the follower vehicle may also be a mobile carrier vehicle (or "mobile carrier") configured as a companion to a human. In various embodiments, a mobile carrier vehicle can be a vehicle that includes structural and functional elements that define at least one volume useful for carrying goods, such as a cargo volume or compartment 116. In various embodiments, the one or more cargo volume can be configured to receive functional systems or subsystems that can interface with power and/or control ports of the self-driving vehicle, for use by the leader and or the self-driving follower vehicle. However, the follower vehicle is not limited to mobile carriers, and could, for example, take other forms of personal use and/or companion vehicles.

Generally, the vehicle 100, as a follower vehicle, acquires a leader and is responsive to the leader and the leader's actions. As a follower vehicle, the leader can be a human in some embodiments, but in other embodiments the leader could be another vehicle. The follower vehicle need not always physically lag behind a leader, but it may in a majority of operations. For example, as will be apparent from the various embodiments described herein, the follower vehicle can proceed the human in some instances, at least for a portion of a path taken by the human. Such instances can include, but may not be limited to, passage through various types of doorways, vestibules, passageways, and/or other structural elements, such as elevators. In various embodiments, the follower vehicle does not mimic human behavior, but rather is responsive to human behavior and structural elements to implement a behavior that is different from, but cooperative with, the human's to safely and efficiently navigate an encountered structural element with the human leader.

In some embodiments, the follower vehicle may precede a leader in a specific instance in accordance with an applicable behavior model, for example when encountering a specific structural element accounted for in a corresponding behavior model. That is, the follower vehicle can be configured to cooperatively negotiate structural elements with a human leader, for example, by implementing a behavior model associated with the structural element, e.g., a doorway.

The structural elements can form part of an environment, where the environment can be indoor, outdoor, a transition from indoor to outdoor, and/or a transition from outdoor to indoor. The environment can be or include a building or an outdoor area, as examples.

The behavior models may take the form of a set of stored computer instructions and/or code executable by at least one processor configured to control aspects of the follower vehicle. All or part of the computer instructions and/or code can be stored locally on the vehicle (e.g., in computer storage 14) or remotely. The behavior models' computer executable instructions can be used by the vehicle control module 20 to cause the drive system 30 to shift and/or manipulate the body 110 to engage in communicative behaviors. In some embodiments, the drive control system 22 and the body control system 24 work together by respectively controlling the wheel motors 32 and attitude motors/actuators 34 to engage in the communicative behaviors. The communicative behaviors are related to the various drive control operations, since the communicative behaviors cause the body to communicate the drive system operation.

Therefore, executing the behavior models by the processors 12 may control the drive, acceleration, deceleration, turning, pausing and/or stopping functions of the vehicle 100. Other functionality of the follower vehicle may also be controlled by execution of the behavior models. Execution of the behavior models, therefore, improves the overall operation of the vehicle, e.g., making the vehicle more efficient, safe, responsive, and/or user-friendly, while also making the follower vehicle less of a distraction and obstacle to human users and others.

FIG. 11 through 16 show various forms of body dynamics for a vehicle 100, such as a follower vehicle, in accordance with aspects of the inventive concepts. Through the examples in FIGS. 11-16, the orientation of the body 110 relative to the wheels 122, 124 of the vehicle 100 communicates behaviors to bystanders. The orientation of the body is controlled by the vehicle control module 20 to reflect acceleration or deceleration of the vehicle and the degree of acceleration or deceleration of the vehicle. Where prior systems may have explicitly controlled the body to maintain a near zero orientation relative to a vertical axis Y in all operations and all states, in accordance with aspects of the inventive concepts the body is controlled to have non-zero orientations for at least some operations, such as for acceleration and deceleration, while remaining sufficiently stable to avoid tipping. Therefore, the stabilization system may control pitch within limits beyond which the vehicle may be considered unstable. In the embodiments of FIGS. 10-15, pitch is the forward or rearward rotation and shifting of the body 110 relative to the wheels 122, 124. In various embodiments, a shifting assembly confines the shifting and/or tilting (or pitch) of the body relative to a chassis and a vertical axis of the vehicle in a range of up to ±20 degrees relative to the axis or, in other embodiments, in a range of up to ±10 degrees relative to the axis.

In various embodiments, a magnitude of the shift and/or tilt is proportional to a rate of acceleration, which can be accomplished by the vehicle control system 20 and processor 12. The processor 12 can cause the body control system 24 to implement proportional shifting and/or tilting of the body 110 based on a drive signal to the drive control system 22.

In each figure, a plurality of vehicle snapshots is shown reflecting stable, nose up, and nose down orientations of the vehicle as it moves. Generally, unless otherwise stated, a stable (near-zero) orientation of the vehicle 100 reflects constant vehicle speed (or constant velocity), nose up reflects acceleration, and nose down reflects deceleration. In each figure, a distance scale 1001 is shown and various vehicle snapshots are represented along the distance scale. The units of the distance scale can be in feet or other units could be used. Here the distance scale 1001 is shown in feet.

A graphical "wheels" scale 1003 is shown and a graphical "body" scale 1005 is shown, which are depicted relative to the distance scale 1001. The wheels scale 1003 depicts a magnitude of shifting or displacement of the vehicle's wheels (only wheel 122 is visible) relative to a reference vertical axis "Y." The wheels 122,124 can be coaxial. The vertical axis Y can be an axis vertical to the ground surface or ground plane on which the vehicle 100 travels. The body scale 1005 depicts a magnitude of the vehicle's body 110 pitch or tilt relative to the vertical axis Y. In each figure, a representative set of depictions of the follower vehicle 100 are shown with a measure of pitch and wheel shifting. It should be understood that each depiction is a snapshot in time relative to the distance scale 1001. Other snapshots for other points in time of the vehicle's travel could additionally and/or alternatively be shown.

The vehicle 100 has a vehicle axis "Y'," which is a vertical axis when the vehicle 100 is in a near-zero orientation. In such a case, the vehicle axis Y' and the vertical axis Y are colinear. In example embodiments, when the vehicle body 110 tilts forward or backward, the vehicle axis Y' is rotated with respect to ground surface, and pitches forward or backward with respect to the vertical axis Y.

A reference horizontal "Z" axis passes through the vertical reference axis Y. A horizontal axis of rotation Z' of the wheels 122, 124 is colinear with the horizontal axis Z when the vehicle is in a neutral orientation and the wheels are not shifted forward or backward from a neutral, centered position.

Figure 11:
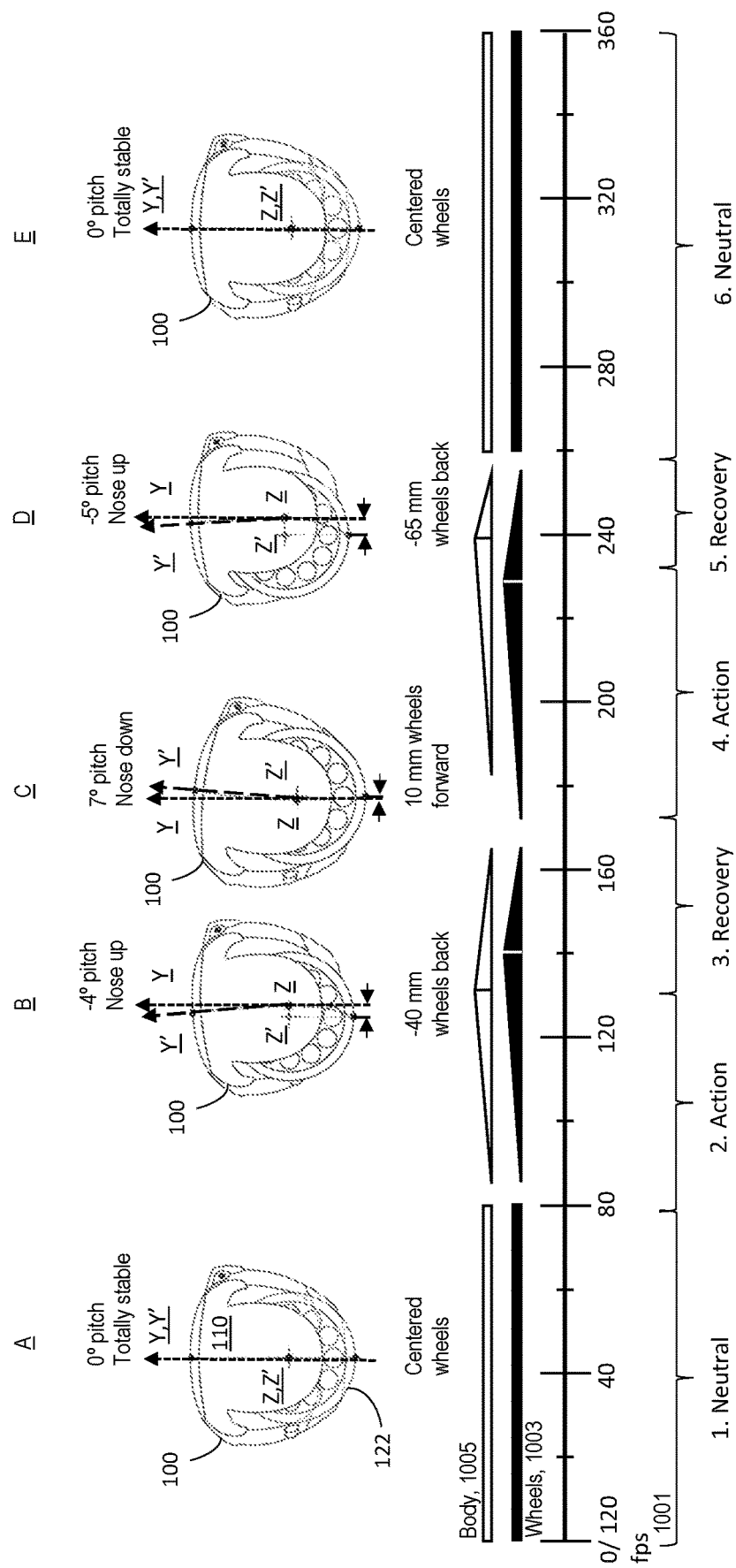
FIG. 11 is a diagram depicting an embodiment of a self-driving vehicle using body dynamics to communicate behaviors, in accordance with aspects of the inventive concepts.

FIG. 11 is a diagram depicting an example of the body dynamics of vehicle 100 experiencing sudden acceleration, in accordance with aspects of the inventive concepts. FIG. 11 shows the vehicle 100 transitioning through various stages of movement as it transitions from a non-zero state, through a sudden acceleration phase, and back to a non-zero state. Snapshots are shown depicting vehicle orientations at different points in time and through different stages of the vehicle's travel.

Stage 1 is a neutral stage, where the vehicle 100 is moving at a constant or substantially constant speed and having an upriaght, near-zero orientation. In this stage and orientation, the wheels scale 1003 shows a flat line indicating no displacement of the wheels 122, 124 relative to the vehicle axis Y' and vertical axis Y. The wheels 104 are in a neutral, centered position and not displaced, i.e., not moved rearward or forward relative to the Z axis. In this stage and orientation, the body scale 1005 shows a flat line, indicating a 0° pitch of the body 110 relative to the vertical axis Y, i.e., the body 110 is not pitched backward or forward. In this neutral, stable state, the vehicle axis Y' and the vertical Y axis are colinear. A horizontal axis Z and the axis of rotation Z' of the wheels 122, 124 are colinear and intersect the vertical axes Y, Y'. This is depicted in the snapshot A for this stage.

Stage 2 is an action stage, where the action is the vehicle 100 accelerating. During this stage, the vehicle body 110 tilts backward and the wheels 122, 124 shift rearward relative to the vehicle axis Y' as the vehicle 100 accelerates. Accordingly, in snapshot B the vehicle body 110 is shown titled backward with respect to the vertical axis Y, and the wheels 122, 124 are shifted rearward so that the axis of rotation Z' is behind the horizontal axis Z, as the vehicle moves forward. The vehicle axis Y' tilts rearward with respect to the vertical Y axis, which results in a nose up orientation of the vehicle 100. Therefore, the rotation axis Z' of the wheels 122, 124 has also moved rearward with respect to the Y axis. In the snapshot, the vehicle axis Y' has pitched backward by about 4° (or a −4° pitch) and the rotation axis Z' of the wheels 104 has translated rearward by about 40 mm (or about −40 mm). In other embodiments and in other points in this stage, these measures could be different. In this stage, the wheels scale 1003 shows the magnitude of the displacement of the wheels 104 gradually increasing to a point and then decreasing. The body scale 1005 shows the magnitude of the tilt of the body 102 gradually increasing. In this embodiment, the tilt of the body 102 peaks within the stage and before the displacement of the wheels 104 peaks. In this stage, the body dynamics communicate acceleration to bystanders.

Stage 3 is a recovery stage, where the vehicle 100 performs the action of decelerating. The vehicle body 110 tilts forward and the wheels 122, 124 shift forward as the vehicle 100 decelerates, caused by the momentum of the slowing vehicle. Accordingly, the vehicle body 110 is shown titled forward with respect to the vertical axis Y in this stage, and the wheels 122, 124 is shifted forward, so that the axis of rotation Z' of the wheels is in front of the horizontal axis Z, as the vehicle 100 moves forward, but slows. The vehicle axis Y' similarly tilts forward with respect to the vertical Y axis. Therefore, the rotation axis Z' of the wheels 122, 124 as also moved forward with respect to the Y axis. In snapshot C, the vehicle axis Y' has pitched forward by about 7° and the axis of rotation Z' of the wheels 122, 124 (and rotation axis Z of the wheels) has translated forward about 10 mm. This results in a nose down orientation of the vehicle 100. In other embodiments, these measures could be different. In this stage, the wheels scale 1003 shows that the magnitude of the displacement of the wheels 122, 124 peaks and then transitions downward from the peak. Also, the body scale 1005 shows the magnitude of the tilt of the body 110 transitioning downward from the peak of the prior stage. In this stage, the body dynamics communicate deceleration to bystanders.

Stage 4 is another action stage, where the action is the vehicle 100 again accelerating. During this stage, the vehicle body 110 again tilts backward and the wheels 122, 124 again shift rearward as the vehicle 100 accelerates. In this stage, the wheels scale 1003 shows the magnitude of the displacement of the axis of rotation Z' of the wheels 122, 124 as gradually increasing to a point and then decreasing. The body scale 1005 shows the magnitude of the tilt of the body 110 as gradually increasing. In this embodiment, the tilt of the body 110 peaks after the displacement of the wheels 122, 124. In this stage, the body dynamics communicate the transition from deceleration to acceleration to bystanders which is greater than the acceleration in stage 2 as evidenced by the greater pitch angle in stage 4.

Stage 5 is a recovery stage, where the vehicle 100 performs the action of transitioning out of acceleration to a constant speed. In snapshot D, as the vehicle transitions out of acceleration, the vehicle body 110 is shown titled backward with respect to the vertical axis Y, and the axis of rotation Z' of the wheels 122, 124 is shifted rearward, behind the horizontal axis Z, as the vehicle 100 moves forward. This results in a nose up orientation of the vehicle 100. The vehicle axis Y' tilts rearward with respect to the vertical Y axis. Therefore, the axis of rotation Z' of the wheels 122, 124 has shifted rearward with respect to the Y axis. In the snapshot, the vehicle axis Y' has pitched backward by about 5° (or a −5° pitch) and the rotation axis Z' of the wheels 122, 124 has translated rearward by about 65 mm (or about −65 mm). In other embodiments and in other points in this stage, these measures could be different. In this stage, the wheels scale 1003 shows the magnitude of the displacement of the axis of rotation of the wheels 122, 124 transitioning downward from the peak of the prior stage. The body scale 1005 shows the magnitude of the body 110 pitch peaking and then transitioning downward. In this stage, the body dynamics communicate to bystanders that the acceleration is greater than the acceleration in stage 2 as evidenced by the greater pitch angle.

Stage 6 is a neutral stage, where the vehicle 100 has returned to a near-zero orientation, moving at a constant or substantially constant speed. In this stage and orientation, the wheels scale 1003 shows a flat line for displacement of the axis of rotation Z' wheels 122, 124 relative to the horizontal axis Z, indicating that the wheels 122, 124 are in a neutral, centered position and not displaced, i.e., not moved rearward or forward. In this stage and orientation, the body scale 1005 shows a flat line, indicating a 0° pitch of the body relative to the vertical axis Y, i.e., the body 110 is not pitched backward or forward. The vehicle axis Y' and the vertical Y axis are colinear. The horizontal rotation axis Z' of the wheels 122, 124 intersects the vertical axes Y, Y', and is colinear with the horizontal axis Z. This is depicted in the snapshot E for this stage. This stage communicates the constant speed of the vehicle.

Figure 12:
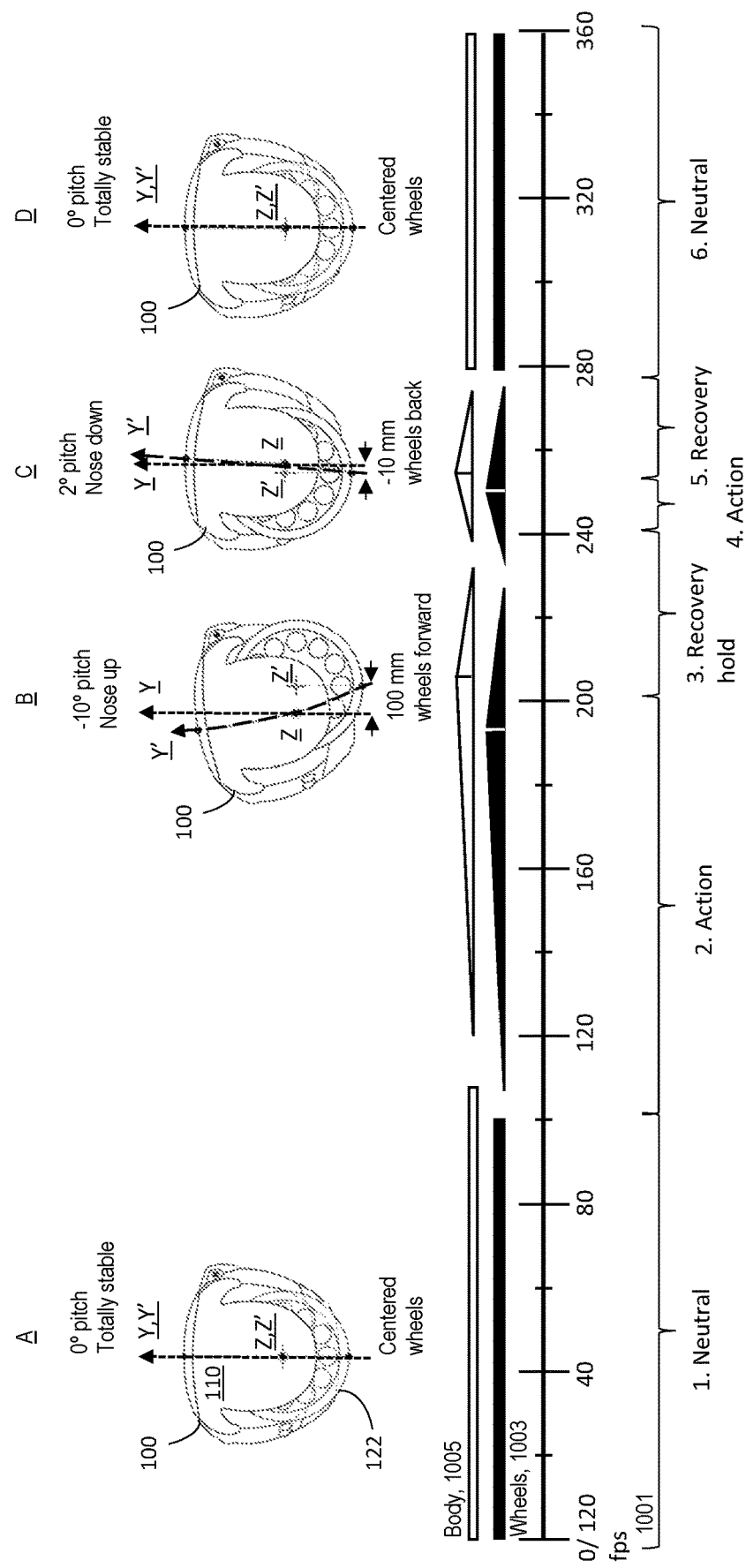
FIG. 12 is a diagram depicting another embodiment the self-driving vehicle using body dynamics to communicate behaviors, in accordance with aspects of the inventive concepts.

FIG. 12 is a diagram depicting an embodiment of the vehicle 100 using body dynamics to communicate a sudden braking behavior, in accordance with aspects of the inventive concepts. FIG. 12 shows the vehicle 100 transitioning through various stages of shifting as it transitions from a stable state, through a sudden braking phase, and back to a stable state. Snapshots are shown depicting vehicle orientations at different points in time through the different stages.

Stage 1 is a neutral stage, where the vehicle 100 is in a stable near-zero orientation, moving at a constant or substantially constant speed. In this stage and orientation, the wheels scale 1003 shows a flat line for displacement of the axis of rotation Z' of the wheels 122, 124 relative to the horizontal axis Z, indicating that the wheels 122, 124 are in a neutral position and not displaced, i.e., not moved rearward or forward. In this stage and orientation, the body scale 1005 shows a flat line, indicating a 0° pitch of the body 110 relative to the vertical axis Y, i.e., the body 110 is not pitched backward or forward. The vehicle axis Y' and the vertical Y axis are colinear. The horizontal rotation axis Z' of the wheels 122, 124 intersects the vertical axes Y, Y', and is colinear with the horizontal axis Z. This is depicted in the snapshot A for this stage.

Stage 2 is an action stage, where the action is the vehicle 100 suddenly breaking. During this stage, the vehicle body 102 tilts backward and the wheels 122, 124 shift forward as the vehicle 100 quickly decelerates. Accordingly, in snapshot B the vehicle body 110 is shown titled backward with respect to the vertical axis Y, and the axis of rotation Z' of the wheels 122, 124 is shifted forward, in front of the horizontal axis Z, as the vehicle slows while still moving forward. This results in a nose up orientation of the vehicle 100. The central vertical axis of the vehicle Y' similarly tilts rearward with respect to the vertical Y axis. The rotation axis Z' of the wheels 122, 124 has shifted forward with respect to the Y axis. In the snapshot, the vehicle axis Y' has pitched backward by about 10° (or a −10° pitch) and the rotation axis Z' of the wheels 122, 124 has translated forward by about 100 mm. In other embodiments and in other points in this stage, these measures could be different. In this stage, the wheels scale 1003 shows the magnitude of the displacement of the axis of rotation Z' of the wheels 122, 124 as increasing to a point and then beginning to decrease. The body scale 1005 shows the magnitude of the tilt of the body 110 as gradually increasing through the stage. In this embodiment, the displacement of the wheels 122, 124 peaks before the tilt of the body 110.

Stage 3 is a recovery-hold stage, where the vehicle 100 performs the action of reducing the rate of deceleration. The degree of tilt of the body 110 and of the displacement of the axis of rotation Z' of the wheels 122, 124 can be reduced as compared to stage 2.

Stage 4 is an action stage, where the vehicle transitions from the recovery-hold action and can experience reorientation as a result of forward momentum coming out of such a stage that can cause the vehicle to shift from the rearward tilt, i.e., nose up, toward a forward tilt, i.e., nose down. Both orientations are non-zero orientations with respect to the Y axis.

Stage 5 is a recovery stage, where the vehicle 100 performs the action of transitioning to a constant speed. In snapshot C, as the vehicle transitions, the vehicle body 110 is shown titled forward with respect to the vertical axis Y, and the wheels 122, 124 are shifted rearward, so that the axis of rotation Z' of the wheels is behind the horizontal axis Z. This results in a nose down orientation of the vehicle 100. The vehicle axis Y' similarly tilts forward with respect to the vertical Y axis. Therefore, the rotation axis Z of the wheels 122, 124 has also moved rearward with respect to the vertical Y axis. In the snapshot, the vehicle axis Y' has pitched forward by about 2° and the rotation axis Z' of the wheels 122, 124 has translated rearward by about 10 mm (or about −10 mm). In other embodiments and in other points in this stage, these measures could be different. In this stage, the wheels scale 1003 shows the magnitude of the displacement of the axis of rotation Z' of the wheels 122, 124 transitioning downward from the peak of the prior stage. Also, the body scale 1005 shows the magnitude of the body 110 pitch peaking and then transitioning downward.

Stage 6 is a neutral stage, where the vehicle 100 has returned to stability, moving at a constant or substantially constant speed and having a neutral orientation. In this stage and orientation, the wheels scale 1003 shows a flat line for displacement of the axis of rotation of the wheels 122, 124 relative to the horizontal axis Z, indicating that the wheels 122, 124 are in a neutral position and not displaced, i.e., not moved rearward or forward. In this stage and orientation, the body scale 1005 shows a flat line, indicating a 0° pitch of the body relative to the vertical axis Y, i.e., the body 110 is not pitched backward or forward. The vehicle axis Y' and the vertical Y axis are colinear. The horizontal rotation axis Z' of the wheels 110 intersects the vertical axes Y, Y' and is colinear with the horizontal axis Z. This is depicted in the snapshot E for this stage.

Figure 13:
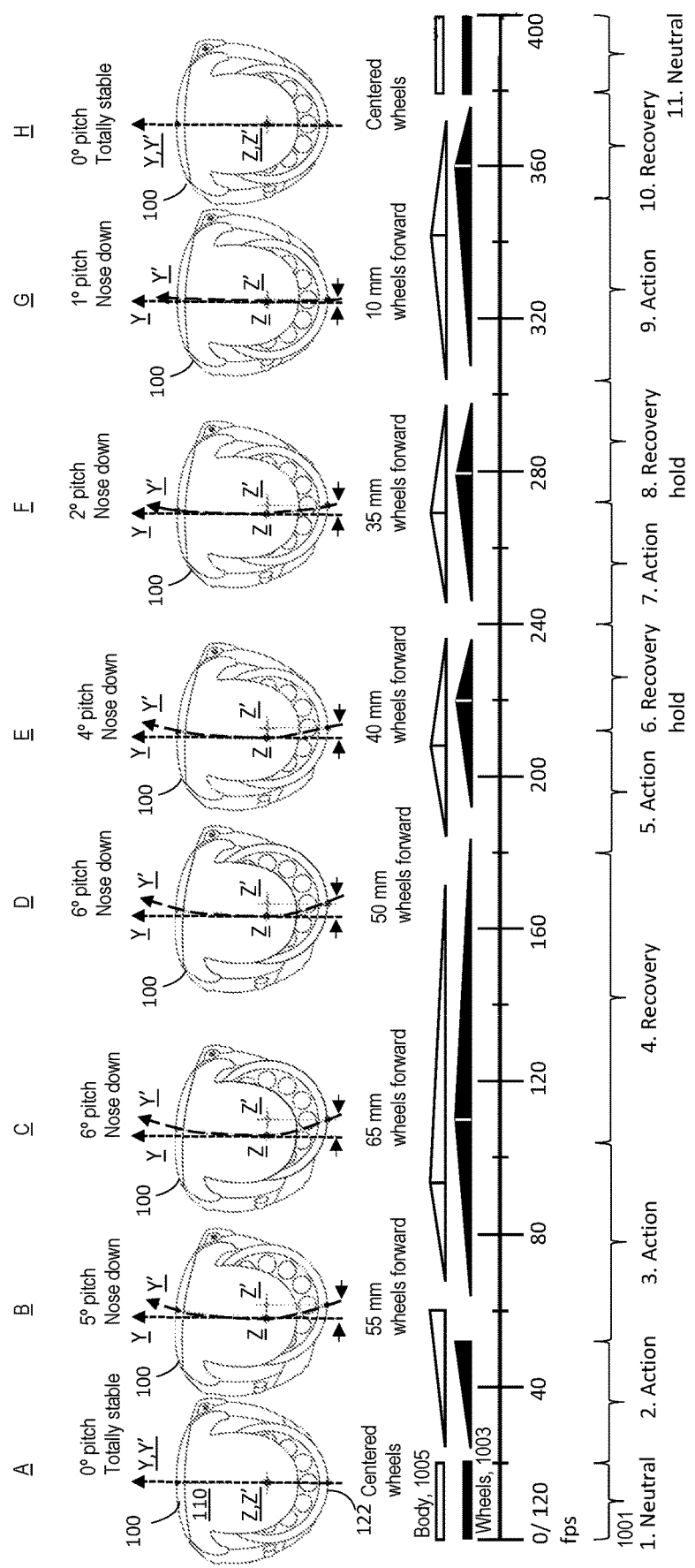
FIG. 13 is a diagram depicting another embodiment the self-driving vehicle using body dynamics to communicate behaviors, in accordance with aspects of the inventive concepts.

FIG. 13 is a diagram depicting an embodiment of the vehicle 100 using body dynamics to communicate deceleration, in accordance with aspects of the inventive concepts. FIG. 13 shows the follower vehicle 100 transitioning through various stages of movement as it transitions from a stable state, through a "creeping," i.e., low velocity, phase, and back to a stable state. A set of snapshots are shown depicting vehicle orientations at different points in time through the different stages.

Stage 1 is a neutral stage, where the vehicle 100 is stable, moving at a constant or substantially constant speed and having a neutral near-zero orientation. In this stage and orientation, the wheels scale 1003 shows a flat line for displacement of the axis of rotation of the wheels 122, 124 relative to the horizontal axis Z, indicating that the wheels 122, 124 are in a neutral, centered position and not displaced, i.e., not moved rearward or forward. In this stage and orientation, the body scale 1005 shows a flat line, indicating a 0° pitch of the body 110 relative to the vertical axis Y, i.e., the body 110 is not pitched backward or forward. The vehicle axis Y' and the vertical Y axis are colinear. A horizontal rotation axis Z' of the wheels 122, 124 intersects the vertical axes Y, Y' and is colinear with the horizontal axis Z. This is depicted in the snapshot A for this stage.

Stage 2 is an action stage, where the action is the vehicle 100 slowing or decelerating. During this stage, the vehicle body 110 tilts forward and the wheels 122, 124 shift forward as the vehicle 100 decelerates. Accordingly, in snapshot B the vehicle body 110 is shown titled forward with respect to the vertical axis Y, and the axis of rotation Z' of the wheels 122, 124 is shifted forward, in front of the horizontal axis Z, as the vehicle slows while still moving forward. This results in a nose down orientation of the vehicle. The central vertical axis of the vehicle Y' similarly tilts forward with respect to the vertical Y axis. The rotation axis Z' of the wheels 122, 124 has shifted forward with respect to the Y axis. In the snapshot, the vehicle axis Y' has pitched forward by about 5° and the rotation axis Z' of the wheels 122, 124 has translated forward by about 55 mm. In other embodiments and in other points in this stage, these measures could be different. In this stage, the wheels scale 1003 shows the magnitude of the displacement of the axis of rotation of the wheels 122, 124 increasing to a point through the stage. Similarly, the body scale 1005 shows the magnitude of the tilt of the body 110 as gradually increasing. In this embodiment, the displacement of the axis of rotation of the wheels 122, 124 peaks before the tilt of the body 110.

Stage 3 is an action stage, where the action is the vehicle 100 continuing to slow, as in stage 2. The action of the wheels and body is similar to stage 2. Accordingly, in snapshot C the vehicle body 110 is shown titled forward with respect to the vertical axis Y, and the wheels 122, 124 are shifted forward, so that the axis of rotation Z' of the wheels 122, 124 is in front of the horizontal axis Z, as the vehicle slows while still moving forward. This results in a nose down orientation of the vehicle 100. In the snapshot, the vehicle axis Y' has pitched forward by about 6° and the rotation axis Z' of the wheels 122, 124 has translated forward by about 65 mm. In other embodiments and in other points in this stage, these measures could be different. In this stage, the wheels scale 1003 shows the magnitude of the displacement of the axis of rotation Z of the wheels 122, 124 as increasing through the stage. The body scale 1005 shows the magnitude of the tilt of the body 110 as gradually increasing to a peak and then beginning to decrease. In this embodiment, the tilt of the body 110 peaks before the displacement of the wheels 122, 124.

Stage 4 is a recovery stage, where the vehicle 100 performs the action of continuing to slow, where the rate of slowing has decreased. In snapshot D, the vehicle body 110 is shown titled forward with respect to the vertical axis Y, and the wheels 122, 124 are shifted forward, in front of the vertical axis. This results in a nose down orientation of the vehicle 100. The vehicle axis Y' similarly tilts forward with respect to the vertical Y axis. Therefore, the rotation axis Z' of the wheels 122, 124 also remains forward with respect to the vertical Y axis and the horizontal axis Z. In the snapshot, the vehicle axis Y' has pitched forward by about 6° and the rotation axis Z' of the wheels 122, 124 has translated forward by about 50 mm. In other embodiments and in other points in this stage, these measures could be different. In this stage, the wheels scale 1003 shows the magnitude of the displacement of the axis of rotation Z' of the wheels 122, 124 transitioning downward from the peak of stage 3. Also, the body scale 1005 shows the magnitude of the body 110 pitch peaking and then transitioning downward.

Stage 5 is an action stage, where the action of the vehicle 100 continues to be slowing, as in previous stages. The action of the wheels and body is similar to prior stages. Accordingly, in snapshot E the vehicle body 110 is shown titled forward with respect to the vertical axis Y, and the wheels 122, 124 remain shifted forward, so that the axis of rotation Z' of the wheels remains in front of the horizontal axis Z, as the vehicle slows while still moving forward. This results in a continued nose down orientation of the vehicle 100. In the snapshot, the vehicle axis Y' has pitched forward by about 4° and the rotation axis Z' of the wheels 122, 124 has translated forward by about 40 mm, indicating that the vehicle is moving more slowly than in the prior stage. In other embodiments and in other points in this stage, these measures could be different. In this stage, the wheels scale 1003 shows the magnitude of the displacement of the axis of rotation Z' of the wheels 122,124 as increasing through the stage. Similarly, the body scale 1005 shows the magnitude of the tilt of the body 110 as gradually increasing and then beginning to decrease. In this embodiment, the tilt of the body 110 peaks before the displacement of the wheels 122, 124.

Stage 6 is a recovery-hold stage, where the vehicle 100 performs the action of continuing to reduce its speed. The degree of tilt of the body 110 and of the displacement of the wheels 122,124, and axis of rotation Z' of the wheels, can decrease though the stage.

Stage 7 is an action stage, where the action of the vehicle 100 continues to be slowing, as in previous stages. The action of the wheels and body is similar to prior stages. Accordingly, in snapshot F the vehicle body 110 is shown titled forward with respect to the vertical axis Y, and the wheels 122, 124 remain shifted forward, so that the axis of rotation Z' of the wheels remains in front of the horizontal axis Z, as the vehicle slows while still moving forward. This results in a continued nose down orientation of the vehicle 100. In the snapshot, the vehicle axis Y' has pitched forward by about 2° and the rotation axis Z' of the wheels 122, 124 has translated forward by about 35 mm, indicating that the vehicle is moving more slowly than in the prior stage. In other embodiments and in other points in this stage, these measures could be different. In this stage, the wheels scale 1003 shows the magnitude of the displacement of the wheels 124, 122 as increasing through the stage. The body scale 1005 shows the magnitude of the tilt of the body 110 as gradually increasing and then beginning to decrease. In this embodiment, the tilt of the body 110 peaks before the displacement of the wheels 122, 124.

Stage 8 is a recovery-hold stage, where the vehicle 100 performs the action of continuing to reduce its speed. The degree of tilt of the body 110 and of the displacement of the wheels 122, 124 can decrease through the stage.

Stage 9 is an action stage, where the action of the vehicle 100 continues to be slowing, as in previous stages. The action of the wheels 122, 124 and body 110 is similar to prior stages. Accordingly, in snapshot G the vehicle body 110 is shown titled forward with respect to the vertical axis Y, and the wheels 122, 124 remain shifted forward, such that the axis of rotation Z' of the wheels remains in front of the horizontal axis Z, as the vehicle slows while still moving forward. This results in a continued nose down orientation of the vehicle 100. In the snapshot, the vehicle axis Y' has pitched forward by about 1° and the rotation axis Z' of the wheels 122, 124 has translated forward by about 10 mm, indicating that the vehicle is moving more slowly than in the prior stage. In other embodiments and in other points in this stage, these measures could be different. In this stage, the wheels scale 1003 shows the magnitude of the displacement of the axis of rotation Z' of the wheels 122, 124 as increasing through the stage. The body scale 1005 shows the magnitude of the tilt of the body 110 as gradually increasing and then beginning to decrease. In this embodiment, the tilt of the body 110 peaks before the displacement of the wheels 122, 124.

Stage 10 is a recovery stage, where the vehicle 100 performs the action of transitioning to a constant speed. As the vehicle transitions, the vehicle body 110 is shown titled slightly forward with respect to the vertical axis Y, and the wheels 122, 124 are shifted slightly rearward, so the axis of rotation Z' is slightly behind the horizontal axis Z. This results in a slight nose down orientation of the vehicle 100. The vehicle axis Y' similarly tilts forward with respect to the vertical Y axis. The rotation axis Z' of the wheels 122, 124 remains rearward with respect to the Y axis. In this stage, the wheels scale 1003 shows the magnitude of the displacement of the wheels 122, 124 transitioning downward from the peak of stage 9. Also, the body scale 1005 shows the magnitude of the body 110 pitch peaking and then transitioning downward.

Stage 11 is a neutral stage, where the vehicle 100 has returned to stability, moving at a constant or substantially constant speed and having a neutral orientation. In this stage and orientation, the wheels scale 1003 shows a flat line for displacement of the axis of rotation Z' of the wheels 122, 124 relative to the horizontal axis Z, indicating that the wheels 122, 124 are in a neutral, centered position and not displaced, i.e., not moved rearward or forward. In this stage and orientation, the body scale 1005 shows a flat line, indicating a 0° pitch of the body relative to the vertical axis Y, i.e., the body 110 is not pitched backward or forward. The vehicle axis Y' and the vertical Y axis are colinear. The horizontal rotation axis Z' of the wheels 122, 124 intersects the vertical axes Y, Y', and is colinear with the horizontal axis Z. This is depicted in the snapshot H for this stage.

Figure 14:
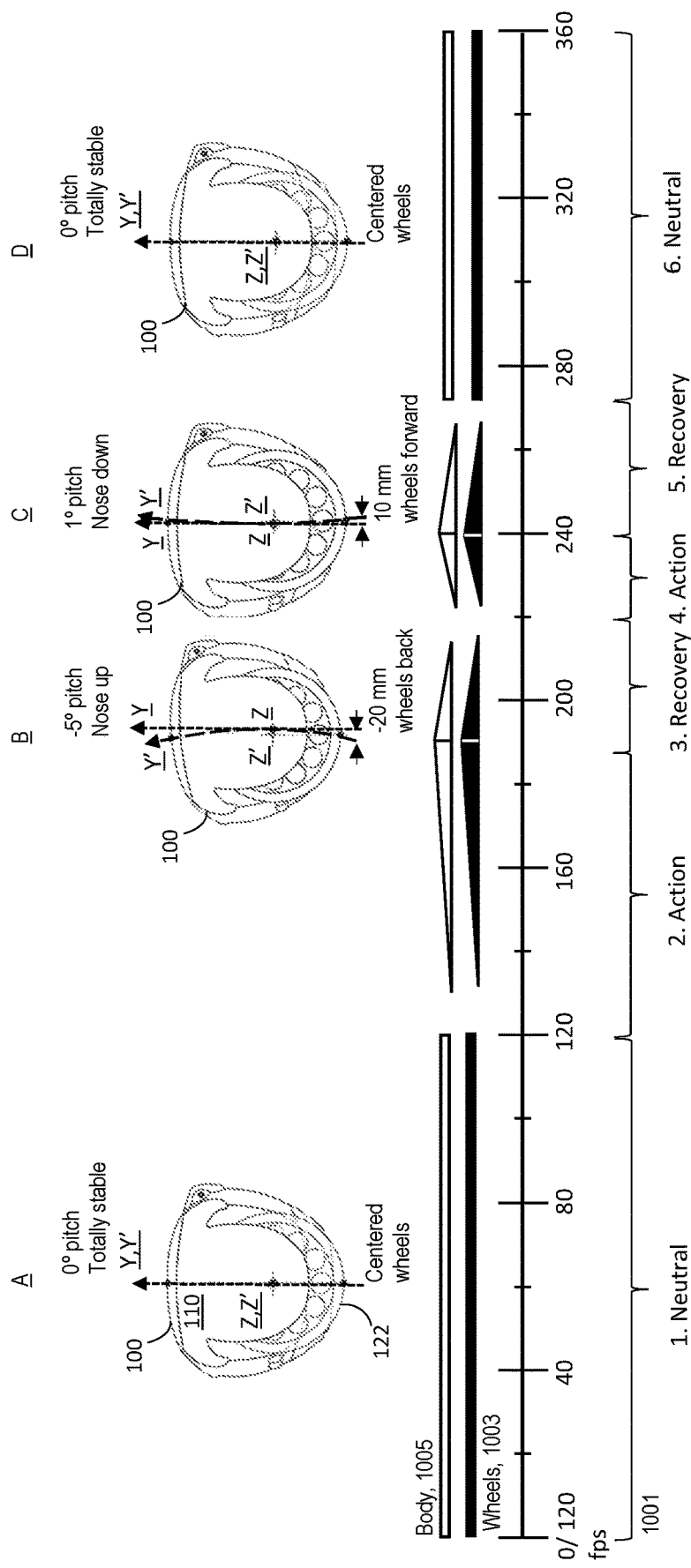
FIG. 14 is a diagram depicting an embodiment of a personal follower vehicle body dynamics during pairing with a leader, in accordance with aspects of the inventive concepts.

FIG. 14 is a diagram depicting an embodiment of the vehicle 100, as a follower vehicle, using body dynamics to communicate behavior during pairing with a leader, in accordance with aspects of the inventive concepts. FIG. 14 shows the follower vehicle 100 transitioning through various stages of movement as it transitions from a stable state, through pairing movements, and back to a stable state. Pairing is a process where the vehicle 100 "acquires" or "pairs" with its leader e.g., a human. Once paired, the vehicle 100 follows the leader and can exhibit the behaviors illustrated in FIGS. 11-16, as well as any of the other behaviors described herein. A set of snapshots are shown depicting vehicle orientations at different points in time through the different stages.

Stage 1 is a neutral stage, where the vehicle 100 is moving at a constant or substantially constant speed and having a neutral, near-zero orientation. In this stage and orientation, the wheels scale 1003 shows a flat line for displacement of the axis of rotation Z' of the wheels 122, 124 relative to the horizontal axis Z, indicating that the wheels 122, 124 are in a neutral position and not displaced, i.e., not moved rearward or forward. In this stage and orientation, as shown in snapshot A, the body scale 1005 shows a flat line, indicating a 0° pitch of the body 110 relative to the vertical axis Y, i.e., the body 110 is not pitched backward or forward. The vehicle axis Y' and the vertical Y axis are colinear. A horizontal rotation axis Z' of the wheels 122, 124 intersects the vertical axes Y, Y' and is colinear with the horizontal axis Z. This is depicted in the snapshot A for this stage.

Stage 2 is an action stage, where the action is the vehicle 100 accelerating. During this stage, the vehicle body 110 tilts backward and the wheels 122, 124 shift rearward as the vehicle 100 accelerates. Accordingly, in snapshot B the vehicle body 110 is shown titled backward with respect to the vertical axis Y, and the wheels 122, 124 are shifted rearward, behind the horizontal axis Z, as the vehicle moves forward. This results in a nose up orientation of the vehicle 100. The vehicle axis Y' similarly tilts rearward with respect to the vertical Y axis. Therefore, the rotation axis Z' of the wheels 122, 124 has also moved rearward with respect to the vertical Y axis and the horizontal Z axis. In the snapshot, the vehicle axis Y' has pitched backward by about 5° (or a −5° pitch) and the rotation axis Z' of the wheels 122, 124 has translated rearward by about 20 mm (or about −20 mm). In other embodiments and in other points in this stage, these measures could be different. In this stage, the wheels scale 1003 shows the magnitude of the displacement of the axis of rotation of the wheels 122, 124 as gradually increasing to a point. Similarly, the body scale 1005 shows the magnitude of the tilt of the body 110 as gradually increasing to a point. In this embodiment, the peak of the tilt of the body 110 occurs at about the same time as the peak of the displacement of the axis of rotation of the wheels 122, 124.

Stage 3 is a recovery stage, where the vehicle 100 performs the action of decelerating. The vehicle body 110 tilts forward and the wheels 122, 124 shift forward as the vehicle 100 decelerates. Accordingly, the vehicle body 110 begins to move forward with respect to the vertical axis Y in this stage, and the axis of rotation Z' of the wheels 122, 124 begins to shift forward with respect to the vertical axis Y, as the vehicle 100 continues to move forward. The vehicle axis Y' similarly begins to tilt forward with respect to the vertical Y axis. Therefore, the rotation axis Z' of the wheels 122. 124 as also moves forward with respect to the vertical Y axis and the horizontal Z axis.

Stage 4 is an action stage, where the vehicle 100 transitions from the recovery action and can experience a forward momentum coming out of such a stage that can cause the vehicle to shift from the rearward, nose up tilt toward a forward, nose down tilt. In this stage, the body tilt and the wheel displacement magnitudes increase and peak at the end of the stage.

Stage 5 is a recovery stage, from the transition action in stage 4. In snapshot C, the vehicle axis Y' has pitched forward by about 1° and the wheels 122, 124 (and rotation axis Z' of the wheels) have translated forward about 10 mm. This results in a slight nose down orientation of the vehicle 100. In other embodiments, these measures could be different. In this stage, the body tilt and the wheel displacement magnitudes decrease from the peak at the end of the prior stage.

Stage 6 is a neutral stage, where the vehicle 100 has returned to stability, moving at a constant or substantially constant speed and having a neutral, near-zero orientation. In this stage and orientation, the wheels scale 1003 shows a flat line for displacement of the axis of rotation Z' of the wheels 122, 124 relative to the horizontal axis Z, indicating that the wheels 122,124 are in a neutral, centered position and not displaced, i.e., not moved rearward or forward. In this stage and orientation, the body scale 1005 shows a flat line, indicating a 0° pitch of the body relative to the vertical axis Y, i.e., the body 110 is not pitched backward or forward. The vehicle axis Y' and the vertical Y axis are colinear. The horizontal rotation axis Z' of the wheels 122, 124 intersects the vertical axes Y, Y' and is colinear with the horizontal axis Z. This is depicted in the snapshot D for this stage.

Figure 15:
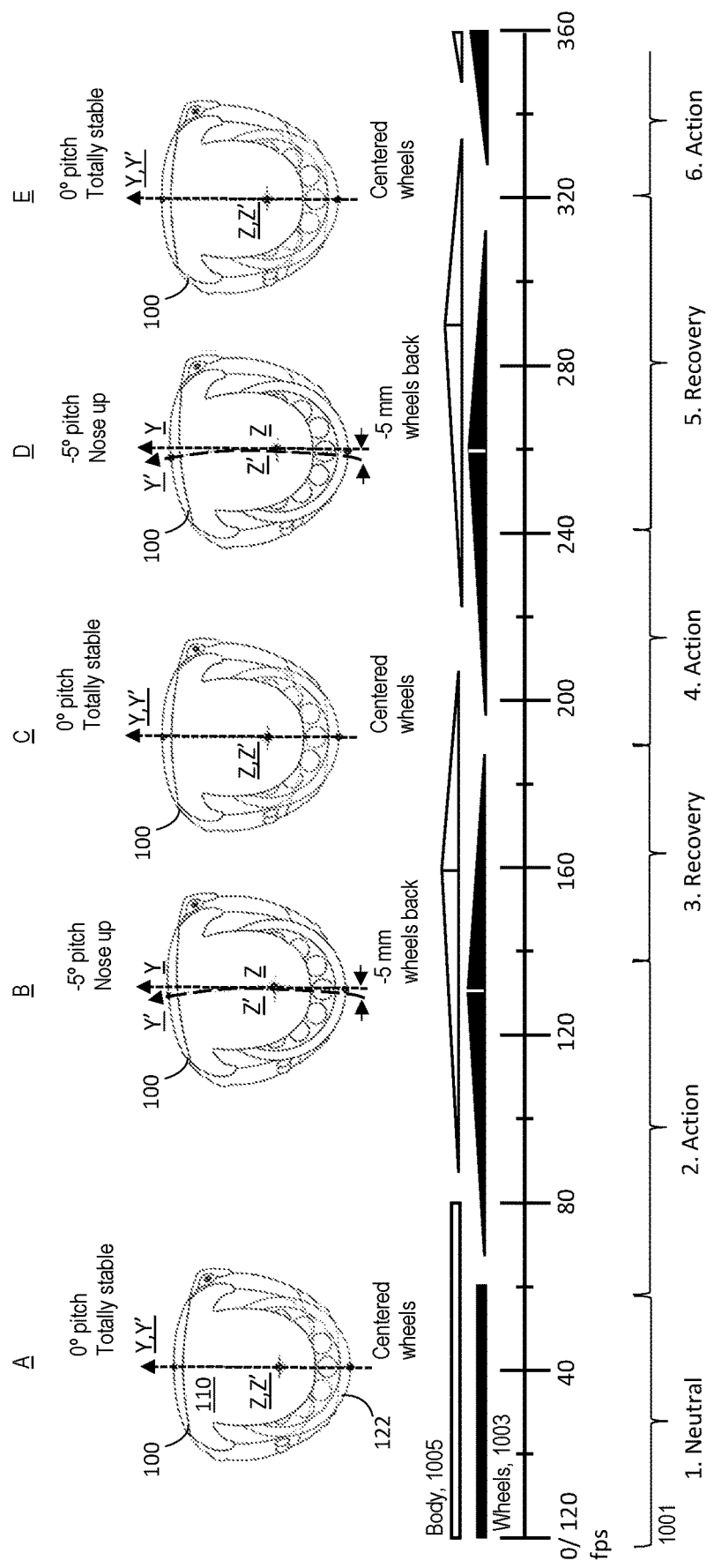
FIG. 15 is a diagram depicting another embodiment the self-driving vehicle using body dynamics to communicate behaviors, in accordance with aspects of the inventive concepts.

FIG. 15 is a diagram depicting an embodiment of the vehicle 100 using body dynamics to communicate behaviors, in accordance with aspects of the inventive concepts. The vehicle begins in a neutral stage, speeds up and returns to a neutral stage, then speeds up again, and then returns to a neutral stage again, where a neutral stage can be a constant velocity stage.

Stage 1 is a neutral stage, where the vehicle 100 is stable, moving at a constant or substantially constant speed and having a neutral, near-zero orientation. In this stage and orientation, the wheels scale 1003 shows a flat line for displacement of the axis of rotation Z' of the wheels 122, 124 relative to the horizontal axis Z, indicating that the wheels 122, 124 are in a neutral, centered position and not displaced, i.e., not moved rearward or forward. In this stage and orientation, as shown in snapshot A, the body scale 1005 shows a flat line, indicating a 0° pitch of the body 110 relative to the vertical axis Y, i.e., the body 110 is not pitched backward or forward. The vehicle axis Y' and the vertical Y axis are colinear. The horizontal rotation axis Z' of the wheels 122, 124 intersects the vertical axes Y, Y' and is colinear with the horizontal axis Z. This is depicted in the snapshot A for this stage.

Stage 2 is an action stage, where the action is the vehicle 100 accelerating. During this stage, the vehicle body 110 tilts backward and the wheels 122, 124 shift rearward as the vehicle 100 accelerates. Accordingly, in snapshot B, which is at the end of this stage, the vehicle body 110 is shown titled backward with respect to the vertical axis Y, and the wheels 122, 124 are shifted rearward, behind the horizontal axis Z, as the vehicle moves forward. This results in a nose up orientation of the vehicle 100. The central vertical axis of the vehicle Y' similarly tilts rearward with respect to the vertical Y axis. Therefore, the rotation axis Z' of the wheels 122, 124 has shifted rearward with respect to the vertical Y axis and the horizontal axis Z. In the snapshot, the vehicle axis Y' has pitched backward by about 5° (or a −5° pitch) and the rotation axis Z of the wheels 122, 124 has translated rearward by about 20 mm (or about −20 mm). In other embodiments and in other points in this stage, these measures could be different. In this stage, the wheels scale 1003 shows the magnitude of the displacement of the axis of rotation Z' of the wheels 122, 124 as gradually increasing to a point at the end of the stage. The body scale 1005 shows the magnitude of the tilt of the body 110 gradually increases through the stage. In this embodiment, the peak of the tilt of the body 110 occurs after the peak of the displacement of the wheels 122, 124, and in the next stage.

Stage 3 is a recovery stage, from the acceleration action in stage 2. In this stage, the vehicle transitions back to a stable state. In this stage, the wheels scale 1003 shows that the displacement magnitude of the axis of rotation of the wheels 122, 124 decreases from a peak at the end of the prior stage until the wheels 122, 124 return to a centered position. The body scale 1005 shows the body 110 transitioning from the nose up orientation to a neutral orientation having a 0° pitch relative to the vertical axis Y, i.e., the body 110 is not pitched backward or forward, as shown in snapshot C. The vehicle axis Y' and the vertical Y axis are colinear. A horizontal rotation axis Z' of the wheels 122, 124 intersects the vertical axes Y, Y' and is colinear with the horizontal axis Z.

Stage 4 is an action stage, similar to stage 2, where the action is the vehicle 100 accelerating. During this stage, the vehicle body 110 tilts backward and the wheels 122, 124 shift rearward as the vehicle 100 accelerates. Accordingly, in snapshot D, which is at the end of this stage, the vehicle body 110 is shown titled backward with respect to the vertical axis Y, and the axis of rotation Z' of the wheels 122, 124 is shifted rearward, behind the horizontal axis Z, as the vehicle moves forward. This results in a nose up orientation of the vehicle 100. The central vertical axis of the vehicle Y' similarly tilts rearward with respect to the vertical Y axis. Therefore, the rotation axis Z' of the wheels 122, 124 has also moved rearward with respect to the vertical Y axis and the horizontal axis Z. In the snapshot, the vehicle axis Y' has pitched backward by about 5° (or a −5° pitch) and the rotation axis Z' of the wheels 122, 124 has translated rearward by about 20 mm (or about −20 mm). In other embodiments and in other points in this stage, these measures could be different. In this stage, the wheels scale 1003 shows the magnitude of the displacement of the rotation axis Z' of the wheels 122, 124 as gradually increasing to a point at the end of the stage. The body scale 1005 shows the magnitude of the tilt of the body 110 gradually increases through the stage. In this embodiment, the peak of the tilt of the body 110 occurs after the peak of the displacement of the wheels 122, 124, and in the next stage.

Stage 5 is a recovery stage from the acceleration action in stage 4, similar to stage 3. In this stage, the vehicle transitions back toward a stable state, the vehicle axis Y' pitches forward and the wheels 122, 124 (and rotation axis Z' of the wheels) translate forward. In this stage, the wheels scale 1003 shows that the displacement magnitude of the rotation axis Z of the wheels 122, 124 decreases from a peak at the end of the prior stage. The body scale 1005 shows the body 110 transitioning from the nose up orientation toward a neutral orientation.

Stage 6 is an action stage, shown in part, which is similar to stages 2 and 4. Therefore, the action is an acceleration action that would reorient the vehicle to a nose up orientation. The pattern could continue, creating a "wave" effect with iterations of accelerations as the vehicle 100 as the vehicle travels.

Figure 16:
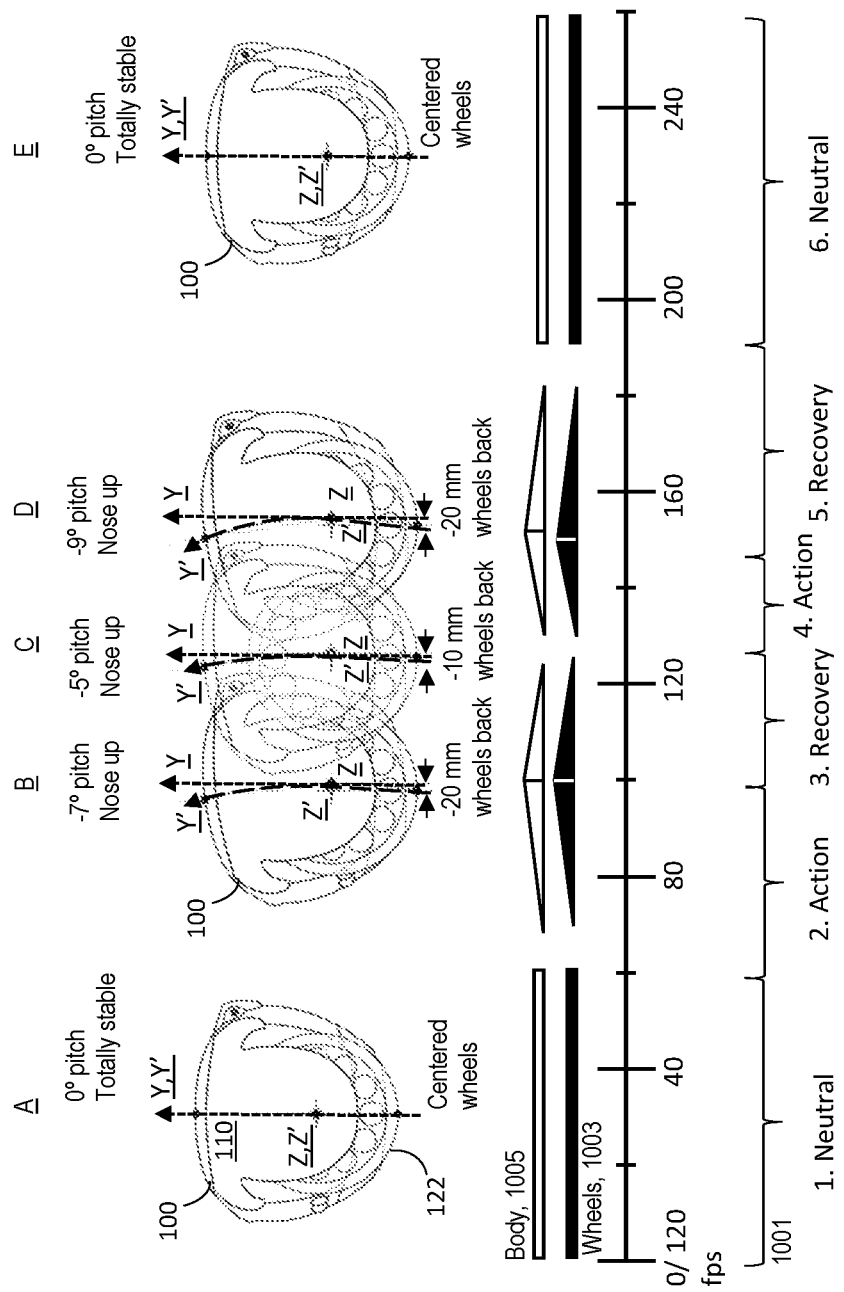
FIG. 16 is a diagram depicting another embodiment the self-driving vehicle using body dynamics to communicate behaviors, in accordance with aspects of the inventive concepts.

FIG. 16 is a diagram depicting an embodiment of the vehicle 100 using body dynamics to communication behavior during various acceleration stages, in accordance with aspects of the inventive concepts. The vehicle begins and ends in a neutral, stable state with various accelerations in between.

Stage 1 is a neutral stage, where the vehicle 100 is stable, moving at a constant or substantially constant speed and having a neutral, near-zerp orientation. In this stage and orientation, the wheels scale 1003 shows a flat line for displacement of the rotation axis Z' of the wheels 122, 124 relative to the horizontal axis Z, indicating that the wheels 122, 124 are in a neutral, centered position and not displaced, i.e., not moved rearward or forward. In this stage and orientation, the body scale 1005 shows a flat line, indicating a 0° pitch of the body 110 relative to the vertical axis Y, i.e., the body 110 is not pitched backward or forward. The vehicle axis Y' and the vertical Y axis are colinear. A horizontal rotation axis Z' of the wheels 122, 124 intersects the vertical axes Y, Y', and is colinear with the horizontal axis Z. This is depicted in the snapshot A for this stage.

Stage 2 is an action stage, where the action is the vehicle 100 accelerating. During this stage, the vehicle body 110 tilts backward and the wheels 122, 124 shift rearward as the vehicle 100 accelerates. Accordingly, in snapshot B, which is at the end of this stage, the vehicle body 110 is shown titled backward with respect to the vertical axis Y, and the rotation Z' of wheels 122, 124 is shifted rearward, behind the horizontal axis Z, as the vehicle moves forward. This results in a nose up orientation of the vehicle 100. The central vertical axis of the vehicle Y' similarly tilts rearward with respect to the vertical Y axis. Therefore, the rotation axis Z' of the wheels 122, 124 has also moved rearward with respect to the Y axis. In the snapshot, the vehicle axis Y' has pitched backward by about 7° (or a −7° pitch) and the rotation axis Z' of the wheels 122, 124 has translated rearward by about 20 mm (or about −20 mm). In other embodiments and in other points in this stage, these measures could be different. In this stage, the wheels scale 1003 shows the magnitude of the displacement of the axis of rotation Z' of the wheels 122, 124 gradually increases to a point at the end of the stage. The body scale 1005 shows the magnitude of the tilt of the body 110 as gradually increasing to a point at the end of the stage. In this embodiment, the peak of the tilt of the body 110 and the peak of the displacement of the wheels 110 occur at the end of the stage and at about the same time.

Stage 3 is a recovery stage, from the acceleration action in stage 2. In this stage, the rate of acceleration decreases, causing the degree of pitch and wheel displacement to decrease, but the vehicle does not return to the neutral, stable state in this stage, in this example. As is shown in snapshot C, the vehicle transitions toward a stable state, where the vehicle axis Y' has pitched forward somewhat, but the vehicle is still in a nose up orientation. The vehicle axis Y' remains tilted backward by about 5° (or a −5° pitch) and the wheels 122, 124 (and rotation axis Z of the wheels) remain rearward by about 10 mm (or about −10 mm). This results in a continued nose up orientation of the vehicle 100. In this stage, snapshot C occurs at the end of the stage. During the stage, the wheels scale 1003 shows the displacement magnitude of the axis of rotation of the wheels 122, 124 decreasing from peak at the end of the prior stage. The body scale 1005 shows the magnitude of the tilt of the body 110 decreasing from peak at the end of the prior stage.

Stage 4 is an action stage, where the action is increased acceleration. In this stage, the rate of acceleration increases, causing the degree of pitch and wheel displacement to increase, so the vehicle does not return to the neutral, stable state in this stage, in this example. As is shown in snapshot D, which is at the end of this stage, the vehicle body 102 is shown titled backward with respect to the vertical axis Y, and the wheels 122, 124 remain rearward, with the axis of rotation Z' behind the horizontal axis Z, as the vehicle moves forward. This results in a more exaggerated nose up orientation of the vehicle 100. The central vertical axis of the vehicle Y' increases its tilt rearward with respect to the vertical Y axis. The rotation axis Z' of the wheels 122, 124 has also increased its displacement rearward with respect to the vertical Y axis and horizontal axis Z. In the snapshot, the vehicle axis Y' has pitched backward to about 9° (or a −9° pitch) and the rotation axis Z' of the wheels 122, 124 has translated rearward to about 20 mm (or about −20 mm). In other embodiments and in other points in this stage, these measures could be different. In this stage, the wheels scale 1003 shows the magnitude of the displacement of the axis of rotation Z' of the wheels 122, 124 and as gradually increasing to a point at the end of the stage. The body scale 1005 shows the magnitude of the tilt of the body 110 as gradually increasing to a point at the end of the stage. In this embodiment, the peak of the tilt of the body 110 and the peak of the displacement of the axis of rotation Z' of the wheels 122, 124 occur at the end of the stage and at about the same time.

Stage 5 is a recovery stage, from the acceleration action in stage 4. In this stage, the vehicle transitions toward a neutral, stable state. In this stage, the degree of pitch and wheel displacement to decrease as the vehicle transitions toward to the neutral, stable state. During the stage, the wheels scale 1003 shows the displacement magnitude of the axis of rotation Z' of the wheels 122, 124 decreasing from peak at the end of the prior stage. And the body scale 1005 shows the magnitude of the tilt of the body 110 decreasing from peak at the end of the prior stage.

Stage 6 is a neutral stage, where the vehicle 100 has returned to stability, moving at a constant or substantially constant speed and having a neutral orientation. In this stage and orientation, the wheels scale 1003 shows a flat line for displacement of the axis of rotation Z' of the wheels 122, 124 relative to the horizontal axis Z, indicating that the wheels 122, 124 are in a neutral, central position and not displaced, i.e., not moved rearward or forward. In this stage and orientation, the body scale 1005 shows a flat line, indicating a 0° pitch of the body relative to the vertical axis Y, i.e., the body 102 is not pitched backward or forward. The vehicle axis Y' and the vertical Y axis are colinear. The horizontal rotation axis Z' of the wheels 122, 124 intersects the vertical axes Y, Y', and is colinear with the horizontal axis Z. This is depicted in the snapshot E for this stage.

The above-described vehicle behaviors are representative, and not necessarily exhaustive of the behaviors implemented by the processing capabilities and logic associated with the vehicle. In the case of follower vehicles. many, if not all, of these behaviors can be triggered by queues from the leader based on the vehicle's automated interpretation of the leader's movements and behaviors, and possibly structural features within the environment. Other behaviors could be programmed into and/or learned by the logic associated with follower vehicle.

The behaviors depicted in FIGS. 11-16 are implemented by the processor controlled shifting assembly, which is responsive to acceleration, deceleration, and constant speed functions of the drive system and sensor inputs. In preferred embodiments, a linkage assembly that causes pitch adjustments of the vehicle body may better use body dynamics to communicated vehicle behaviors, linear shifting assemblies (such as linkage assembly 130) may also implement body dynamics sufficiently to communicate vehicle behaviors, e.g., acceleration, deceleration, and constant speed.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A self-driving vehicle, comprising:
   a plurality of wheels coupled to a chassis;
   a body coupled to a shifting assembly that is coupled to the chassis;
   a drive system comprising one or more drive motors arranged to drive one or more of the wheels;
   a body control system comprising one or more attitude motors arranged to drive the shifting assembly; and
   at least one processor configured to control the one or more attitude motors to cause the shifting assembly to implement a motion of the body, the motion selected from the group consisting of a shift and a tilt, to communicate a set of behaviors of the vehicle based on operation of the one or more drive motors, the set of behaviors including:

effectuating rearward motion of the body, the rearward motion selected from the group consisting of a rearward shift and a rearward tilt, to communicate an acceleration behavior, effectuating forward motion of the body, the forward motion selected from the group consisting of a forward shift and a forward tilt, to communicate a deceleration behavior, and maintaining a near-zero shift and a near-zero tilt in orientation of the body to communicate a behavior selected from the group consisting of a stationary behavior and a constant speed behavior.

2. The vehicle of claim 1, wherein the plurality of wheels consists of two wheels.

3. The vehicle of claim 1, wherein the vehicle is a follower vehicle comprising one or more sensors configured to acquire, track, and follow a leader.

4. The vehicle of claim 1, wherein the acceleration behavior comprises tilting the body rearward to have a non-zero orientation of less than 0 degrees relative to a vertical axis and a travel direction of the vehicle when the one or more drive motors accelerate the vehicle in the travel direction.

5. The vehicle of claim 4, wherein a magnitude of the tilt is proportional to a rate of acceleration.

6. The vehicle of claim 1, wherein the acceleration behavior of the vehicle comprises shifting the body rearward relative to a vertical axis and a travel direction of the vehicle when the one or more drive motors accelerate the vehicle in the travel direction.

7. The vehicle of claim 6, wherein a magnitude of the shift is proportional to a rate of acceleration.

8. The vehicle of claim 1, wherein the deceleration behavior of the vehicle comprises tilting the body forward to have a non-zero orientation of more than 0 degrees relative to a vertical axis and a travel direction of the vehicle when the one or more drive motors decelerate the vehicle in the travel direction.

9. The vehicle of claim 8, wherein a magnitude of the tilt is proportional to a rate of deceleration.

10. The vehicle of claim 1, wherein the deceleration behavior of the vehicle comprises shifting the body forward relative to a vertical axis and a travel direction of the vehicle when the one or more drive motors decelerate the vehicle in the travel direction.

11. The vehicle of claim 10, wherein a magnitude of the shift is proportional to a rate of deceleration.

12. The vehicle of claim 1, wherein a magnitude of the shift and/or tilt is proportional to a rate of acceleration or deceleration of the vehicle.

13. The vehicle of claim 1, wherein the shifting assembly is configured to tilt the body relative to the chassis in a range of up to ±10 degrees relative to a vertical vehicle axis.

14. The vehicle of claim 1, wherein the shifting assembly is configured to shift the body relative to the chassis in a range of up to ±100 millimeters relative to a vertical vehicle axis.

15. A method of communicating behaviors by a self-driving vehicle, the self-driving vehicle comprising:
a plurality of wheels coupled to a chassis;
a body coupled to a shifting assembly that is coupled to the chassis;
a drive system comprising one or more drive motors arranged to drive one or more of the wheels;
a body control system comprising one or more attitude motors arranged to drive the shifting assembly; and
at least one processor controlling the one or more attitude motors to cause the shifting assembly to implement a motion of the body, the motion selected from the group consisting of a shift and a tilt, to communicate a set of behaviors of the vehicle based on operation of the one or more drive motors, the method comprising:
effectuating rearward motion of the body, the rearward motion selected from the group consisting of a rearward shift and a rearward tilt, to communicate an acceleration behavior, effectuating forward motion of the body, the forward motion selected from the group consisting of a forward shift and a forward tilt, to communicate a deceleration behavior, and maintaining a near-zero shift and a near-zero tilt, to communicate a behavior selected from the group consisting of a stationary behavior and a constant speed behavior.

16. The method of claim 15, wherein the plurality of wheels consists of two wheels.

17. The method of claim 15, wherein the vehicle is a follower vehicle comprising one or more sensors, and the method includes the vehicle acquiring, tracking, and following a leader while it communicates the behaviors.

18. The method of claim 15, wherein the acceleration behavior of the vehicle includes tilting the body rearward to have a non-zero orientation of less than 0 degrees relative to a vertical axis and a travel direction of the vehicle when the one or more drive motors accelerate the vehicle in the travel direction.

19. The method of claim 18, wherein a magnitude of the tilting is proportional to a rate of acceleration.

20. The method of claim 15, wherein the acceleration behavior of the vehicle includes shifting the body rearward relative to a vertical axis and a travel direction of the vehicle when the one or more drive motors accelerate the vehicle in the travel direction.

21. The method of claim 20, wherein a magnitude of the shifting is proportional to a rate of acceleration.

22. The method of claim 15, wherein the deceleration behavior of the vehicle includes tilting the body forward to have a non-zero orientation of more than 0 degrees relative to a vertical axis and a travel direction of the vehicle when the one or more drive motors decelerate the vehicle in the travel direction.

23. The method of claim 22, wherein a magnitude of the tilting is proportional to a rate of deceleration.

24. The method of claim 15, wherein the deceleration behavior of the vehicle includes shifting the body forward relative to a vertical axis and a travel direction of the vehicle when the one or more drive motors decelerate the vehicle in the travel direction.

25. The method of claim 24, wherein a magnitude of the shifting and/or tilting is proportional to a rate of deceleration.

26. The method of claim 15, wherein a magnitude of the shifting and/or tilting is proportional to a rate of acceleration or deceleration of the vehicle.

27. The method of claim 15, further comprising the shifting assembly confining the tilting of the body relative to the chassis in a range of up to ±10 degrees relative to a vertical vehicle axis.

28. The method of claim 15, further comprising the shifting assembly confining the shifting of the body relative to the chassis in a range of up to ±100 millimeters relative to a vertical vehicle axis.

* * * * *